United States Patent [19]

Kuroda et al.

[11] Patent Number: 5,777,895
[45] Date of Patent: Jul. 7, 1998

[54] REMOTE MANAGEMENT SYSTEM

[75] Inventors: Kiyomitsu Kuroda, Otsu; Ichiro Fukuoka, Kusatsu; Akira Takenaka, Kameoka, all of Japan

[73] Assignee: Sanyo Electric Co., Ltd., Osaka, Japan

[21] Appl. No.: 650,059

[22] Filed: May 17, 1996

[30] Foreign Application Priority Data

May 19, 1995 [JP] Japan ................................. 7-121893
Mar. 12, 1996 [JP] Japan ................................. 8-055195

[51] Int. Cl.⁶ .............................. G06F 15/00; H04M 11/00
[52] U.S. Cl. .................... 364/550; 364/146; 364/188; 340/825.49; 379/106.01
[58] Field of Search ..................... 364/550, DIG. 1, 364/138, 424.11, 146; 379/106, 96; 399/8; 395/184.01; 340/825.35, 825.49, 825.22

[56] References Cited

U.S. PATENT DOCUMENTS 5,442,344  8/1995  Merkle et al. .................... 340/825.35
5,493,267  2/1996  Ahlse et al. ..................... 340/825.22
5,586,174  12/1996 Bogner et al. ..................... 379/106

FOREIGN PATENT DOCUMENTS 6-205900  7/1964  Japan ............................ D06F 95/00
2-174776  7/1990  Japan ............................ G04G 15/00
5-1820    1/1993  Japan ............................ D06F 92/00
6-55049   2/1994  Japan ............................ G07F 17/20
6-55050   2/1994  Japan ............................ H04M 11/00
6-47514   3/1994  Japan ............................ H04Q 9/00

Primary Examiner—James P. Trammell
Assistant Examiner—Kamini S. Shah
Attorney, Agent, or Firm—Darby & Darby

[57] ABSTRACT

A remote management system where a central control apparatus for controlling machines installed in plural stores from remote on receiving data of working conditions of the machines, which is transmitted from terminals of the stores, for displaying a layout of the machines in each store, a machine kind, a layout of the store such as a wall, an entrance and a window on blocks, for example, by a coloring, a hatching of the block, on and off of the display of the block and the like.

18 Claims, 20 Drawing Sheets

FIG. 9

ENTRY OF MACHINE NAME BY STORE  1995. 4. 5 WED.

FIELD: MACHINE NAME

STORE NAME  OHTSU No.1    STORE SELECTION

| MACHINE No. | TYPE | NAME | SER.No. | UPDATE DATE |
|---|---|---|---|---|
| 1 | SCD-6070GC | | | 95/03/17 |
| 2 | SCD-3551GC | | | 95/03/31 |
| 3 | SCD-3131GC | DRYER | | 95/03/13 |
| 4 | ASW- | WASHING MACHINE | | 95/03/13 |
| 5 | SCL-8060C | DRY CLEANING MACHINE | | 95/03/01 |
| 6 | SCW-5121C | | | |
| 7 | SCW-5171C | | | 95/03/01 |
| 8 | SCW-5261C | | | 95/03/01 |

BACKWARD  CANCEL  FORWARD  EXIT

REMOTE MANAGEMENT SYSTEM

BACKGROUND OF THE INVENTION

1. Field of the Invention

The present invention relates to a remote management system, wherein machines controlled by control units, such as microcomputers, are connected to a central control apparatus, namely an arithmetic apparatus such as a personal computer, via means of communications, and the machines are remotely managed by the central control apparatus.

2. Description of the Related Art

In a launderette, for example, wherein a plurality of washing machines and dryers are installed and used for a charge, namely with coins or prepaid cards, a control system for controlling such laundry machines with respect to trouble and charges in a unified way at a remote location is needed in order to enhance control efficiency by reducing the number of the staffs or by stopping making the rounds of launderettes.

This kind of control system has been proposed in Japanese Laid-open Patent Application NO. Hei 6-205900 by the applicant of the present invention. A plurality of laundry machines, such as washing machines and dryers, are installed in each launderette. Sensors, such as a rotation sensor, a thermistor and a magnetic sensor, are disposed in various portions, such as a motor, a drum and a charge box of each laundry machine, and the output signals of these sensors are input to a microcomputer. In accordance with the signals from the sensors, the microcomputer controls the operation of the laundry machine, stores data regarding operating conditions, remaining operation time, sales figures, etc. and transmits the stored data together with an ID (identification) number having been entered beforehand in the microcomputer of each machine to a data controller (hereinafter referred to as DTC) disposed in each launderette. Each DTC is connected via a public telephone line to a central control apparatus comprising a personal computer owned by the proprietor of a laundry business or a management company entrusted with the management of the laundry machines by the proprietor.

In accordance with the instructions of an operator, the central control apparatus transmits a monitor request via the public telephone line to each launderette in order to monitor machine operating conditions, remaining operation time, sales figures, operation charge setting and operation time setting, etc. The DTC sends a command to the microcomputer of each machine installed in the launderette to make the microcomputer transmit data regarding the monitor request. The microcomputer transmits the data to the DTC in accordance with the command having been sent, and the DTC receives and then transmits the data to the central control apparatus.

In case of trouble, such as a machine failure, abnormality or charge theft, the microcomputer of the corresponding laundry machine stops the machine and sends a transmission request to the DTC. Upon receiving a response from the DTC, the microcomputer transmits trouble data such as the kind of trouble and time of occurrence together with machine information such as the machine name and the ID number entered for the machine. The DTC calls up the central control apparatus in order to transmit the received trouble data. Upon receiving a response from the central control apparatus, the DTC transmits the above-mentioned trouble data together with the name of the launderette in which the DTC is installed, as trouble data to the central control apparatus.

Upon receiving the data regarding the monitor request or trouble data, the central control apparatus displays the name of the launderette, the ID number and model of the corresponding machine, the contents of the data, etc. on a monitor display by using characters and numerals so as to be known to the proprietor of the laundry business or the operator of the management company.

In case of conventional remote management systems, however, the central control apparatus uses only characters and numerals when displaying the name of the launderette, the ID number and name of the corresponding machine, etc. in accordance with the received data. Therefore, the proprietor or the operator cannot quickly recognize how the launderette is laid out and where the machine is located.

SUMMARY OF THE INVENTION

Accordingly, a principal object of the present invention is to provide a remote management system capable of allowing the floor layout of a launderette and the locations of machines in the launderette to be understood through intuition by showing schematic representations of the floor layout of the launderette and the locations of the machines in accordance with the information on the floor layout of the launderette in which the machines are installed and the information on the locations of the machines.

A first object of the invention is to provide a remote management system capable of enhancing the processing speed of the operator during the processing of information on machines and also capable of quickly taking action is in the event of emergencies such as machine trouble.

A second object of the invention is to provide a remote management system capable of easily setting information on machine locations.

A third object of the invention is to provide a remote management system capable of displaying more accurate machine locations by using a diagram closely analogous to the shape of the actual floor layout of a launderette wherein machines are located.

A fourth object of the invention is to provide a remote management system allowing machine locations to be understood easily by indicating graphic figures showing the location and size of an entrance in the floor layout of a launderette wherein machines are located.

A fifth object of the invention is to provide a remote management system allowing machines to be identified by indicating the floor layout and machine information such as machine ID numbers at the machine locations shown in the floor layout.

A sixth object of the invention is to provide a remote management system for more accurately indicating the shape of a floor layout area by representing the floor layout area using an assembly of block figures.

A seventh object of the invention is to provide a remote management system capable of obtaining detailed machine information such as the models, external appearances and communication specifications of the machines, as well as the machine locations in the floor layout area.

An eighth object of the invention is to provide a remote management system capable of setting all information on machine locations and floor layout in a launderette without omission.

The above and further objects and features of the invention will more fully be apparent from the following detailed description with accompanying drawings.

BRIEF DESCRIPTION OF THE DRAWING

FIG. 9 is a view illustrating a machine name entering screen for each launderette;

FIG. 17 is a view illustrating a display screen obtained when the detailed machine data key shown in FIG. 16 is clicked;

FIG. 19 is a view illustrating a floor layout display screen; and

DESCRIPTION OF THE PREFERRED EMBODIMENTS

Figure 1:
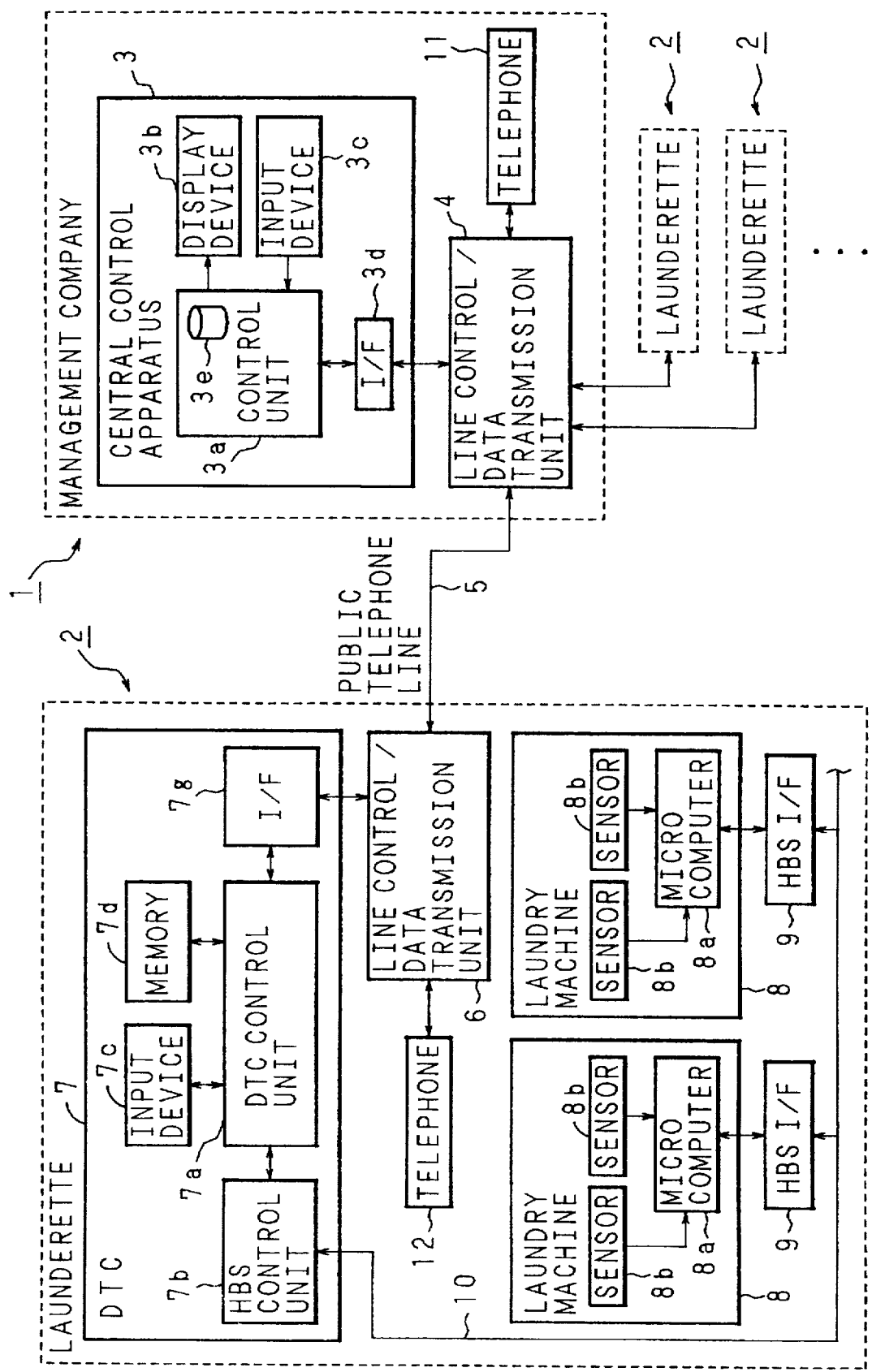
FIG. 1 is a block diagram showing the configuration of a remote management system in accordance with the present invention.

FIG. 1 is a block diagram showing the configuration of a remote management system in accordance with the invention. Referring to FIG. 1, numeral 2 designates a launderette, and numeral 1 designates a management company for managing a plurality of launderettes 2, 2, . . . In the launderette 2, a plurality of laundry machines 8, 8, . . . , such as washing machines, dryers and dry cleaners, are located. In each laundry machine 8, a microcomputer 8a is provided to control the operation of the machine. The microcomputer 8a is started by a charge input command such as coin entry and a start command controls the corresponding machine in accordance with signals from sensors 8b, 8b, . . . such as a rotation speed sensor and a temperature sensor, and stores data regarding charge input, start command, rotation speed, temperature, abnormal charge input, abnormal rotation speed, abnormal temperature, etc.

An HBS interface 9 (hereinafter referred to as I/F) based on a home bus system (hereinafter referred to as BBS) is connected to each microcomputer 8a, and supplies a clock signal to the microcomputer 8a. Half-duplex serial communication is performed between the HBS I/F 9 and the microcomputer 8a in synchronization with the clock signal. With this configuration, the HBS I/F 9 reads data stored in the microcomputer 8a and supplies the data to a DTC 7 via twisted pair wires 10. The twisted pair wires 10 are connected to an HBS control unit 7b of the DTC 7. The HBS control unit 7b controls the transmission of a data transmission request to the laundry machines 8, 8, . . . and also controls the transmission of data from the laundry machines 8, 8, . . . to the DTC 7.

The HBS control unit 7b transmits and receives data transmission requests and received data for the laundry machines 8, 8, . . . to and from the DTC control unit 7a controlling the operation of the DTC 7. The DTC control unit 7a is connected to an input device 7c setting information on the name, telephone number, etc. of the launderette provided with the DTC 7, a memory 7d storing data received from the laundry machines 8, 8, . . . and an I/F 7g such as an RS-232C interface. The communication between the HBS control unit 7b and the laundry machines 8, 8, . . . is performed in accordance with a predetermined order of precedence. The DTC 7 transmits data transmission requests to the laundry machines 8, 8, . . . at predetermined intervals in accordance with the predetermined order of precedence, and stores received data at predetermined addresses of the memory 7d.

The I/F 7g of the DTC 7 is connected to an I/F 3d provided in a central control apparatus 3 comprising a personal computer via a line control/data transmission unit 6 such as a modem, the public telephone line and a line control/data transmission unit 4 on the side of the management company 1. Communications between the line control/data transmission unit 6 and the line control/data transmission unit 4 is performed in accordance with the MNP 5 protocol for data compression or the like. A telephone 12 is connected to the line control/d ata transmission unit 4 on the side of the launderette 2, and a telephone 11 is connected to the line control/data transmission unit 6 on the side of the management company 1 so as to be used for telephone communications.

The central control apparatus 3 is provided with a display device 3b such as a CRT display, an input device 3c such as a keyboard and a mouse, and a control unit 3a such as a CPU. When a-data transmission request such as a sales figure request or an operation condition request, is input from the input device 3c, the control unit 3a transmits the request to the DTC 7 of the launderette 2 via the I/F 3d and the line control/data transmission unit 4, and reads data transmitted from the DTC 7 and received by the line control/data transmission unit 4 via the I/F 3d, and then displays the data on the display device 3c.

In case of trouble such as a failure, abnormality or charge theft at one of the laundry machines 8, 8, . . . , the microcomputer 8a of the laundry machine 8 stops the laundry machine 8 and delivers a transmission request to the DTC 7. Upon receiving a response from the DTC 7, the microcomputer 8a transmits trouble data such as the name and number of the machine and the kind of trouble. The DTC 7 calls up the central control apparatus 3 so as to transmit the received trouble data. Upon receiving a response from the central control apparatus 3, the DTC 7 adds the name of the launderette to the trouble data and transmits the whole data as trouble data to the central control apparatus 3 via the public telephone line 5. The central control apparatus 3 displays the contents of the received trouble data on the display device 3b.

As described later, the name and number of each launderette 2, and the number and model of the laundry machines 8, 8, . . . installed in the launderette 2 have been stored in the memory 3e of the central control apparatus 3. In addition, the locations of the laundry machines 8, 8, . . . have been set in accordance with operator input and stored in the memory 3e. When a specific launderette 2 is selected, the central control apparatus 3 displays a floor layout screen indicating the locations of the laundry machines 8, 8, . . . installed in the launderette on the display device 3b. By selecting a desired laundry machine 8 on the floor layout screen, the above-mentioned data transmission request can be transmitted to only the selected laundry machine 8. Furthermore, upon receiving trouble data, the central control apparatus 3 displays a floor layout screen indicating the locations of the laundry machines 8, 8, . . . together with the name and number of the launderette 2 wherein the trouble occurred so as to indicate the location of the laundry machine 8 which caused the trouble.

Figure 2:
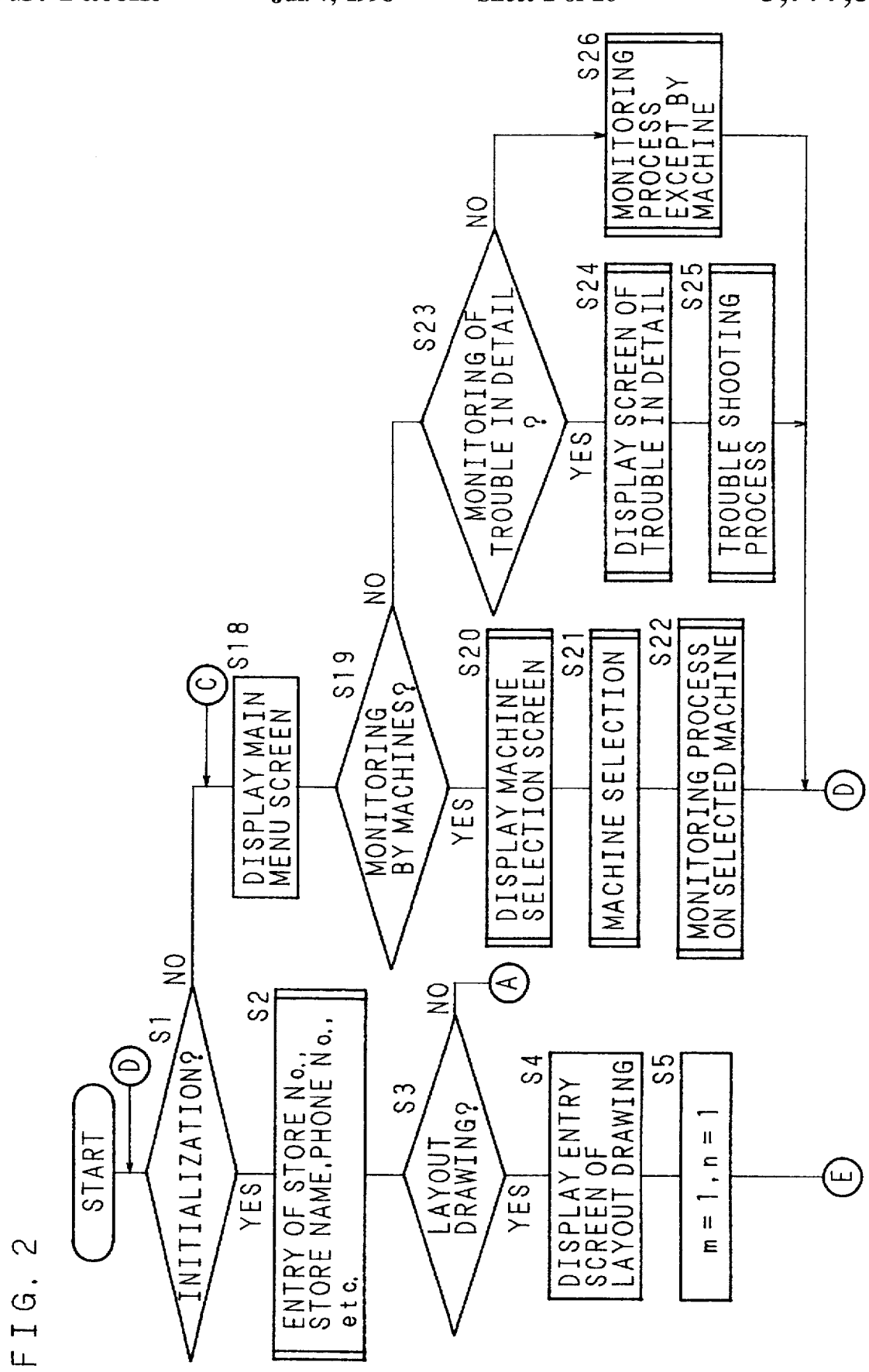
FIGS. 2 and FIG. 3 together form flow chart showing a floor layout setting procedure and a screen display procedure for the central control apparatus of the remote management system in accordance with the invention.
Figure 3:
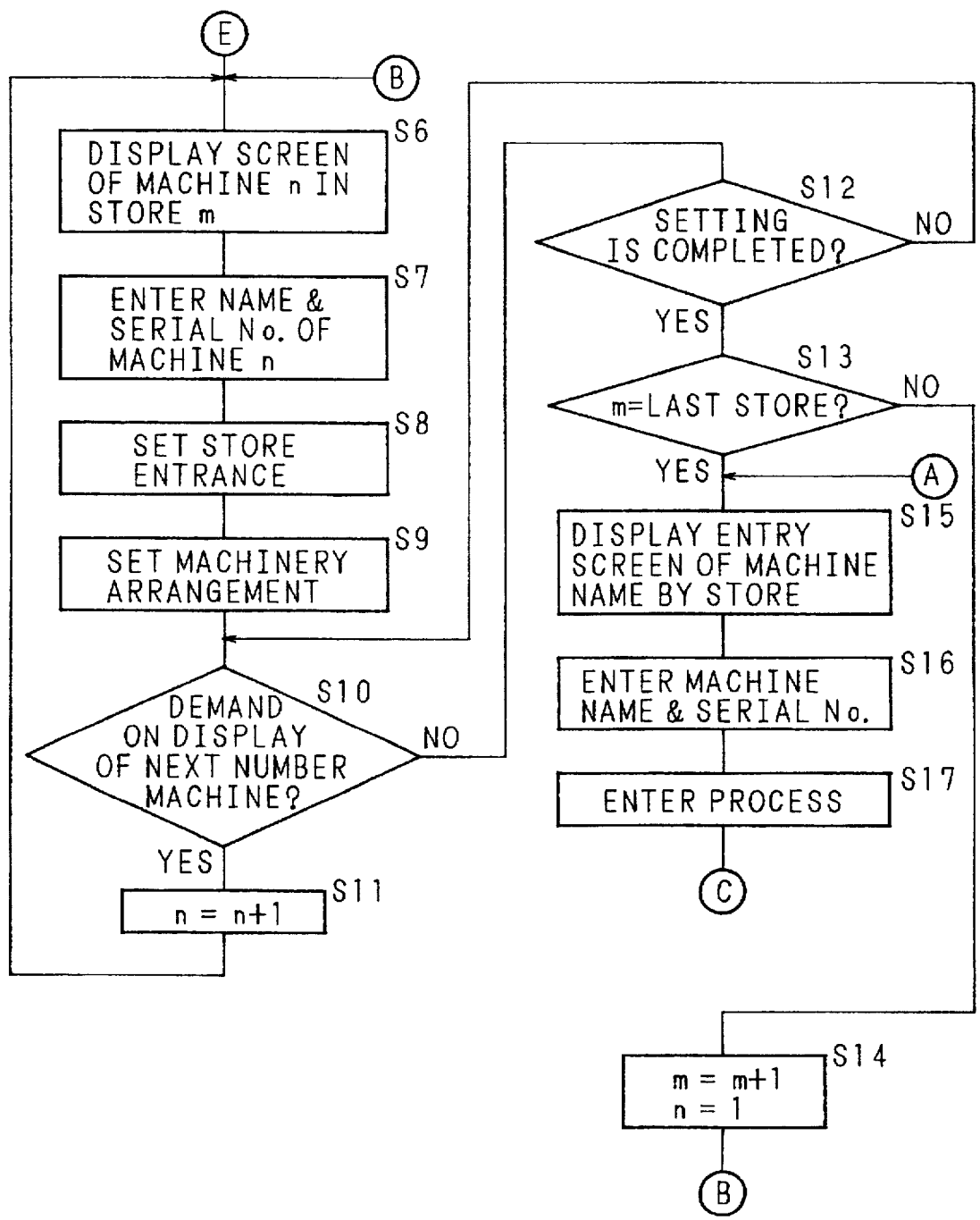

FIGS. 2 and 3 are flowcharts showing a floor layout setting procedure and a screen display procedure for the central control apparatus 3 of the remote management system in accordance with the invention. The central control apparatus 3 determines whether the initial setting for information on the launderettes 2, 2, . . . and the laundry machines 8, 8, . . . located therein has been selected or not (step S1). Upon determining that the initial setting has been selected, the central control apparatus 3 stores in the memory 3e the names and telephone numbers of the plural launderettes 2, 2, . . . having been input from the input device 3c corresponding to the store number (step S2).

After the setting regarding the launderettes 2, 2, . . . is completed, the central control apparatus 3 determines whether a floor layout diagram creation request has been input or not (step S3). Upon determining that the request has been input, the central control apparatus 3 displays a floor layout diagram entering screen (refer to FIG. 8) described later (step S4). The central control apparatus 3 then sets both launderette number counter value m and machine number counter value n at 1, and displays the name of the launderette stored as launderette number "1" and machine number "1" in the corresponding predetermined display areas of the floor layout diagram entering screen (steps S5, S6). When the model name, the machine name such as water washing machine or dryer, the production number, etc. of the laundry machine 8 corresponding 6 to machine number "1" are input from the input device 3c, the central control apparatus 3 enters such information corresponding to machine number "1" in the memory 3e (step S7), and displays the information in a predetermined area in the floor layout diagram entering screen.

Figure 7:
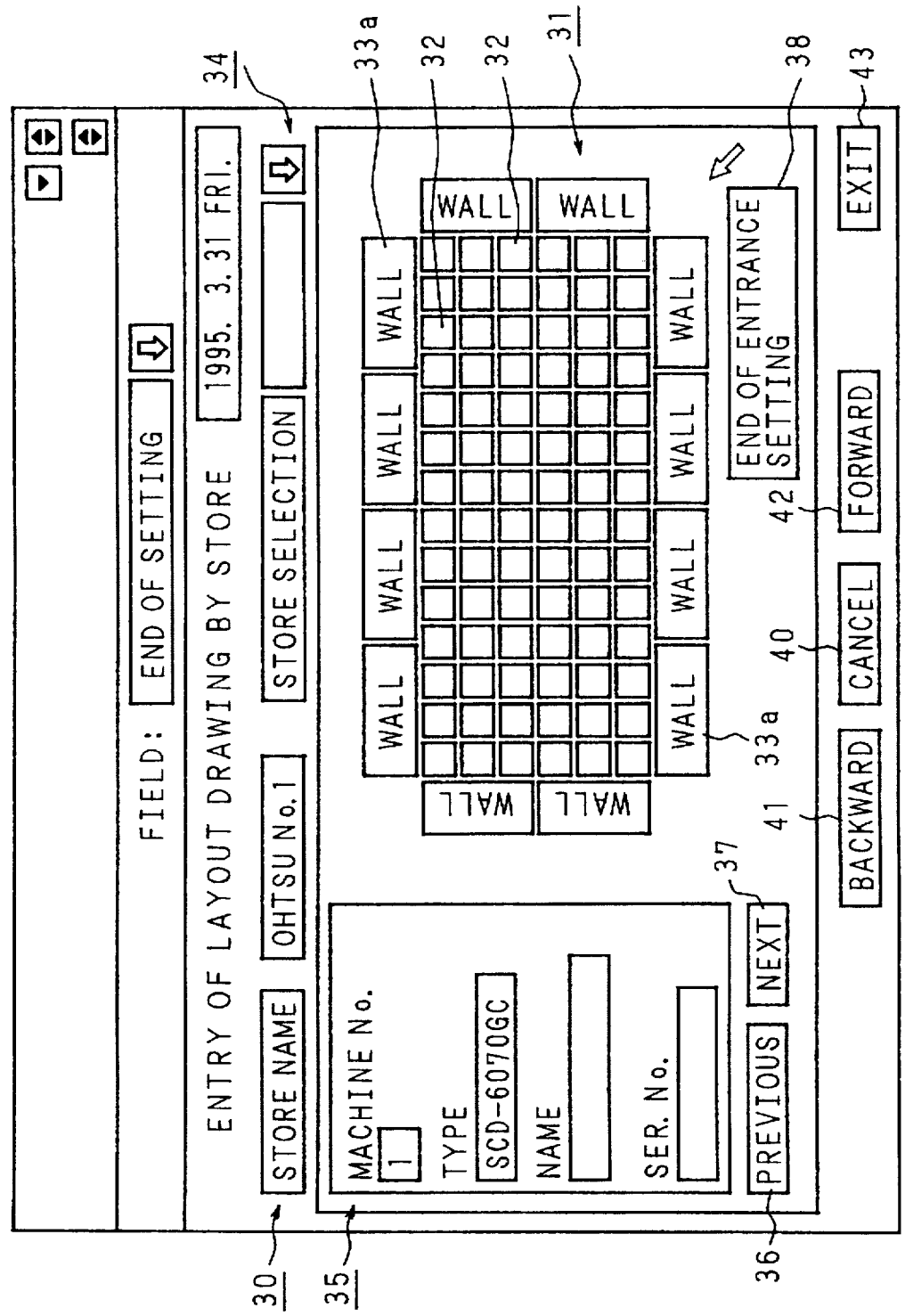
FIG. 7 is a view illustrating a layout drawing entering screen.

FIG. 7 is a view illustrating the floor layout diagram entering screen. On the upper left side of the screen, a launderette name display area 30 is provided to indicate the number and name of a launderette. Under the launderette name display area 30, a machine information display area 35 is provided to enter and indicate the above-mentioned machine number, model name, machine name and production number so that the model name, machine name and production number corresponding to the machine number indicated in the machine information display area 35 are set and entered. In addition, under the machine information display area 35, a model selection key 36 "PREVIOUS MODEL" and a model selection key 37 "NEXT MODEL" are shown in the form of buttons. When the operator moves the pointer to the model selection key 36 or 37 and clicks the key, the machine number previous or next to the indicated machine number is indicated in the machine information display area 35.

On the right side of the machine information display area 35, a floor layout area 31 is provided to indicate the locations of the laundry machines 8, 8, . . . in the launderette. The floor layout area 31 is provided with a plurality of machine blocks 32, 32, . . . obtained by dividing an oblong rectangular area into a matrix form. The circumference of the rectangular area is surrounded by wall surface blocks 33a, 33a, . . . , each of which is provided for three machine blocks.

When the information on the laundry machine 8 corresponding to machine number "1" is stored in step S7, the central control apparatus 3 sets the location of the entrance of the launderette 2 and the location of the laundry machine 8 corresponding to machine number "1" in accordance with operator operation (steps S8, S9). The central control apparatus 3 determines whether a display request for the next machine number has been delivered or not (step S10). When the request has been delivered, the machine number counter value n is incremented to "n+1" (step S11), and steps S6 to S10 are repeated.

On the other hand, when a display request for the next machine number has not been delivered in step S10, the central control apparatus 3 determines whether the end of setting has been input or not (step S12) and stands by until the end of setting is entered. When the end of setting is entered, the central control apparatus 3 determines whether the launderette number counter value m is the last launderette number or not (step S13). When the value m is not the last number, the value m is incremented to "m+1" and the machine number counter value n is reset to "1" (step S14), the operation sequence returns to step S6, and the information on the laundry machines 8, 8, . . . located in the launderette is stored and the locations of the machines are set in the same way as described above.

Figure 8:
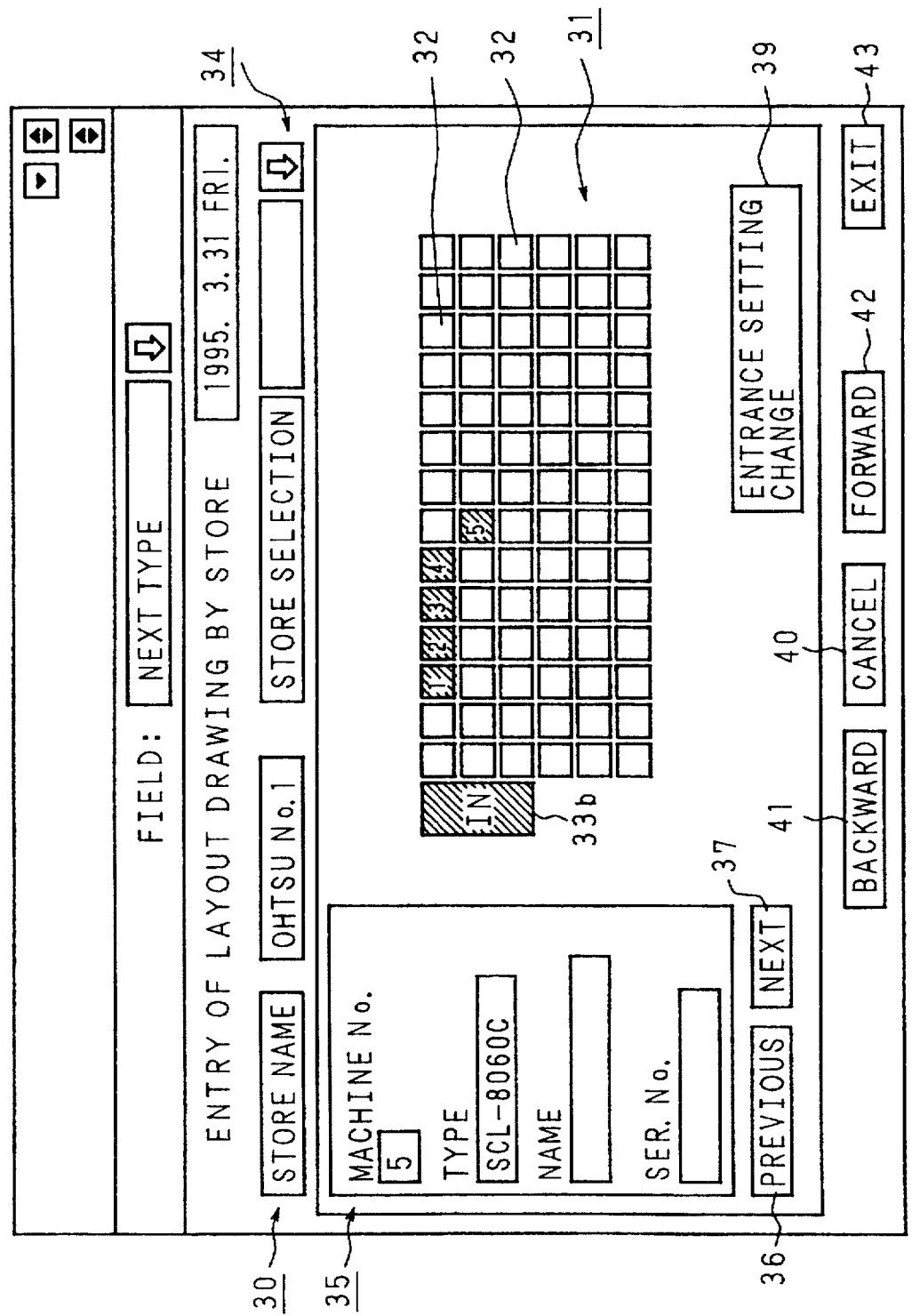
FIG. 8 is a view illustrating the setting of machine locations.

FIG. 8 is a view illustrating the setting of locations. When the model name, machine name and production number corresponding to the machine number indicated in the machine information display area 35 is input, the input data corresponding to the launderette name indicated in the launderette name display area 30 is stored in the memory 3e by the control unit 3a. When the operator moves the pointer to one of the machine blocks 32, 32, . . . and clicks the block, the control unit 3a changes the color of the machine block 32 (from gray to yellow, for example), and displays in the machine block 32 the machine number indicated in the machine information display area 35. As a result, the location of the laundry machine corresponding to the machine number and the information on the machine corresponding to the machine number are set in relation to each other. On the other hand, in the case where the machine number is set at an improper machine block 32, the control unit 3a deletes the machine number from the machine block 32 when the operator clicks the "CANCEL" key 40. The number is then set again at a proper machine block 32 by taking the operation similar to that described above.

After setting the location of the machine corresponding to the machine number indicated in the machine information display area 35, the operator clicks the NEXT MODEL key 37 to indicate the next machine number in the machine information display area 35. When the operator inputs the model name, machine name and production number of the machine corresponding to the machine number indicated in the machine information display area 35 in the same way as described above, the control unit 3a stores the input data in the memory 3e and sets the machine number at the machine block 32 designated by the operator. The above-mentioned operation is repeated until the stored last machine number is reached.

Furthermore, when the operator moves the pointer to one of the wall surface blocks 33a, 33a, . . . and clicks the block in order to set the entrance of the launderette 2, the control unit 3a highlights the block or changes the color of the block to perform a tentative setting. In the case where the tentative setting is improper at this time, the operator clicks the DELETE key 40 to cancel the tentative setting portion and to restore the original indication. The operator then tentatively sets the entrance in the same way as described above. After the tentative setting, the operator clicks the "ENTRANCE SETTING CHANGES" key 39 provided between the floor layout area 31 and the CANCEL key 40. The control unit 3a assigns the selected wall surface block 33a to the entrance block 33b, changes its indication from "WALL SURFACES" ("WALL") to "ENTRANCE" ("IN") and deletes the indications of the wall surface blocks 33a, 33a, . . . which have not been set.

After all the location settings for the launderette indicated in the launderette name display area 34 are completed, the operator clicks the icon of the down-arrow key provided in the launderette selection area 34, and the control unit 3a displays the launderette name and machine number 1 corresponding to the next launderette number stored in the memory 3e. When the machine location settings for all the launderette numbers stored in the memory 3e are completed, the operator clicks a "FORWARD" key 42 to close the floor layout setting screen.

When the central control apparatus 3 determines in step S13 that the launderette number counter value m is the last launderette number stored, the central control apparatus 3 displays a screen for machine name entering by launderette (refer to FIG. 9) described later (step S15) to prompt the operator to confirm or change the names of the entered laundry machines 8, 8, . . . When the operator inputs a change, the central control apparatus 3 enters the change (step S16). The central control apparatus 3 then stores in the memory 3e the locations of the laundry machines 8, 8, . . . and the location of the entrance having been set on the floor layout diagram entering screen, together with the numbers and names of the laundry machines 8, 8, . . . and the launderette number and name having been stored (step S17). This completes the initial setting and the main menu screen appears again (step S18). On the other hand, when the operator determines that no floor layout diagram is created in step S3, the operation sequence is shifted to step S15. The central control apparatus 3 displays the screen for machine name entering by launderette and enters the numbers, names, etc. of the laundry machines 8, 8,. . . installed in each launderette.

FIG. 9 is a view illustrating the screen for machine name entering by launderette. Referring to FIG. 9, the name of the corresponding launderette is indicated at the upper portion of the screen for machine name entering by launderette. Under the launderette name, model names, machine names, production numbers and renewal dates are listed in the order of machine number. In accordance with this list, the operator confirms the machine numbers, model names, etc. of the laundry machines 8, 8, . . . located in the launderette. In the case where an input error is found, the operator designates the item corresponding to the error by moving the pointer and inputs proper data.

After the initial setting is completed, the screen showing character information such as information on monitor by machine and detailed trouble monitor is switched to the main menu screen (step S18), from which a desired menu item is selected. The central control apparatus 3 determines whether the monitor by machine is selected (step S19).

When the central control apparatus 3 determines that the monitor by machine has been selected, the apparatus 3 displays a machine selection screen (step S20).

Figure 4:
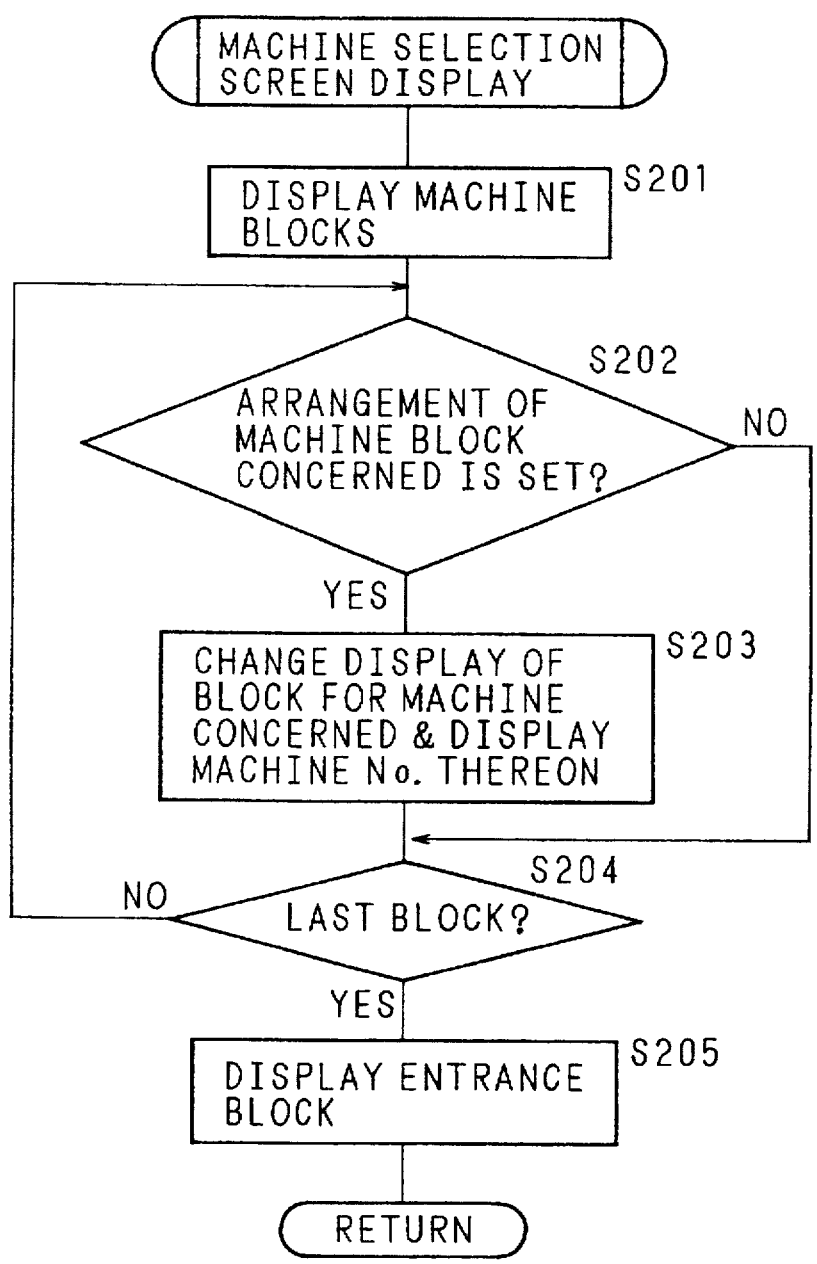
FIG. 4 is a flowchart showing a procedure for displaying a machine selection screen.
Figure 10:
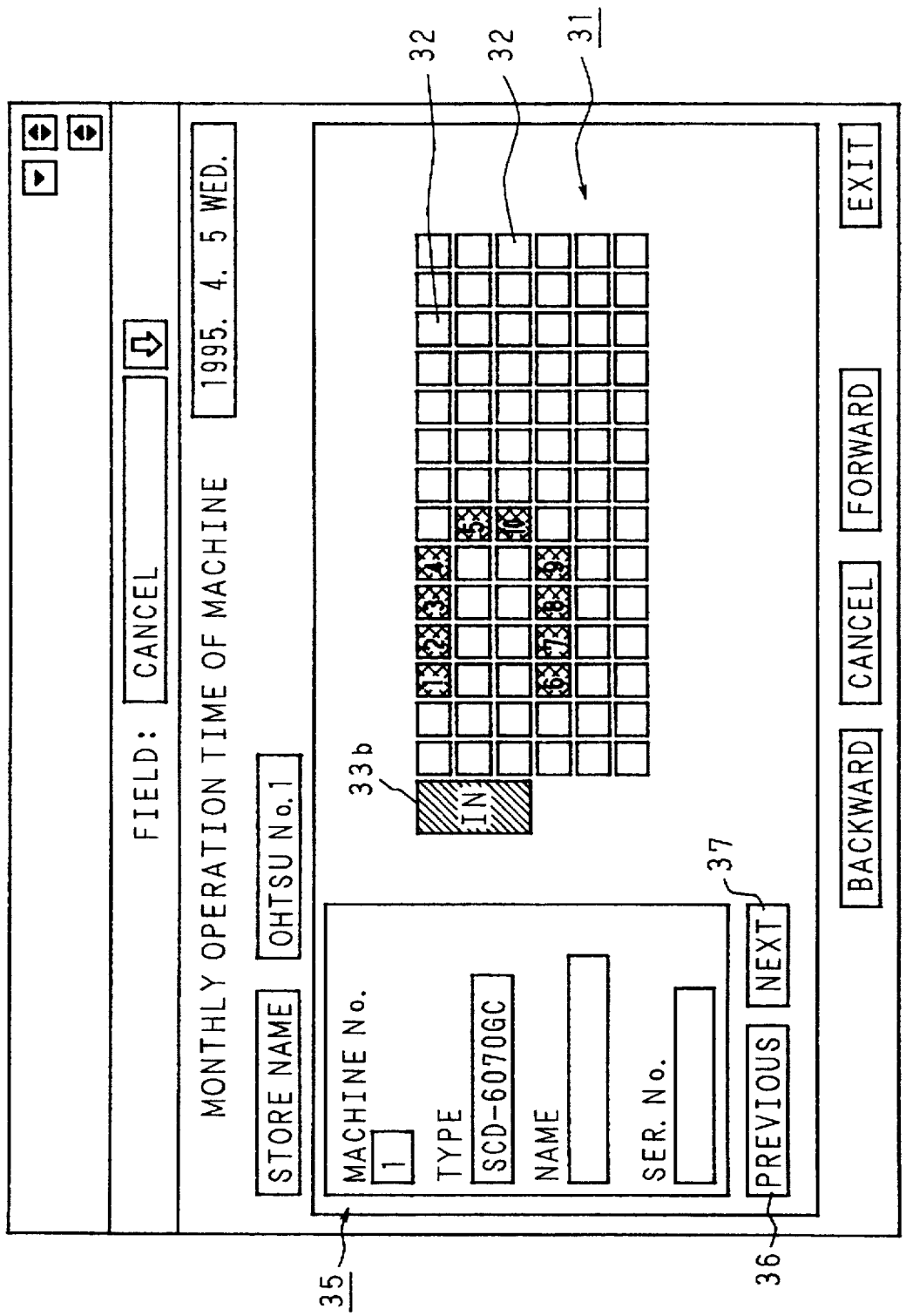
FIG. 10 is a view illustrating an example of the machine selection screen.

FIG. 4 is a flowchart showing a display procedure for the machine selection screen (refer to FIG. 10). The central control apparatus 3 displays machine blocks 32, 32, . . . in accordance with the data on a desired launderette number having been read from the memory 3e (step S201) and determines whether a machine location has been set at the first machine block 32 of a predetermined order (step S202). When a location has been set at the machine block 32, the central control apparatus 3 changes the color of the machine block 32 and displays the machine number having been set (step S203). When no location is set for the machine block 32, the indication of the machine block 32 is not changed. The central control apparatus 3 determines whether the machine block 32 is the last block or not (step S204), and repeats steps S202 and S203 until the last block is reached. After the operation for the last block is completed, the central control apparatus 3 displays the entrance block 33b at a predetermined position around the machine blocks 32, 32, . . . (step S205).

FIG. 10 is a view illustrating an example of the machine selection screen. When the screen for monthly operation time monitor by machine is selected from the main menu screen, the title "MONTHLY OPERATION TIME OF MACHINE" corresponding to the selected menu item appears at the upper portion of the screen as shown in FIG. 10. Under the title, the launderette name corresponding to the first launderette number is indicated. The locations of the laundry machines installed in the launderette are shown by the machine numbers indicated in colored machine blocks 32, 32, . . . As shown obviously in FIG. 10, it is recognized at a glance that the laundry machines of the launderette are arranged in the shape of a square bracket and the entrance is provided opposite to the open area of the square bracket. When the "PREVIOUS MODELS" key 36 or the "NEXT" key 37 is clicked, machine information, such as the model names, machine names, etc. of the laundry machines located in the launderette is indicated in the order of machine number in the machine information display area 35. Consequently, the information can be recognized together with the locations of the corresponding laundry machines. By indicating detailed information including machine numbers in the machine information display area 35, the size of the machine block 32 can be made compact so that the operator can easily recognize the locations of the machines and so that necessary detailed information can be delivered to the operator by using a single screen.

When an optional machine block is selected on the machine selection screen, the central control apparatus 3 recognizes the selection. When a machine number has been set at the selected machine block 32, the machine number, model name, machine name and production number of the machine corresponding to the machine number are indicated in the machine information display area 35 (step S21). In addition, when a monitor request for the laundry machine corresponding to the selected machine block 32 is input, the central control apparatus 3 accesses the laundry machine in accordance with the machine number of the selected laundry machine and the launderette number, and performs monitoring so as to transmit necessary data (step S22).

Figure 5:
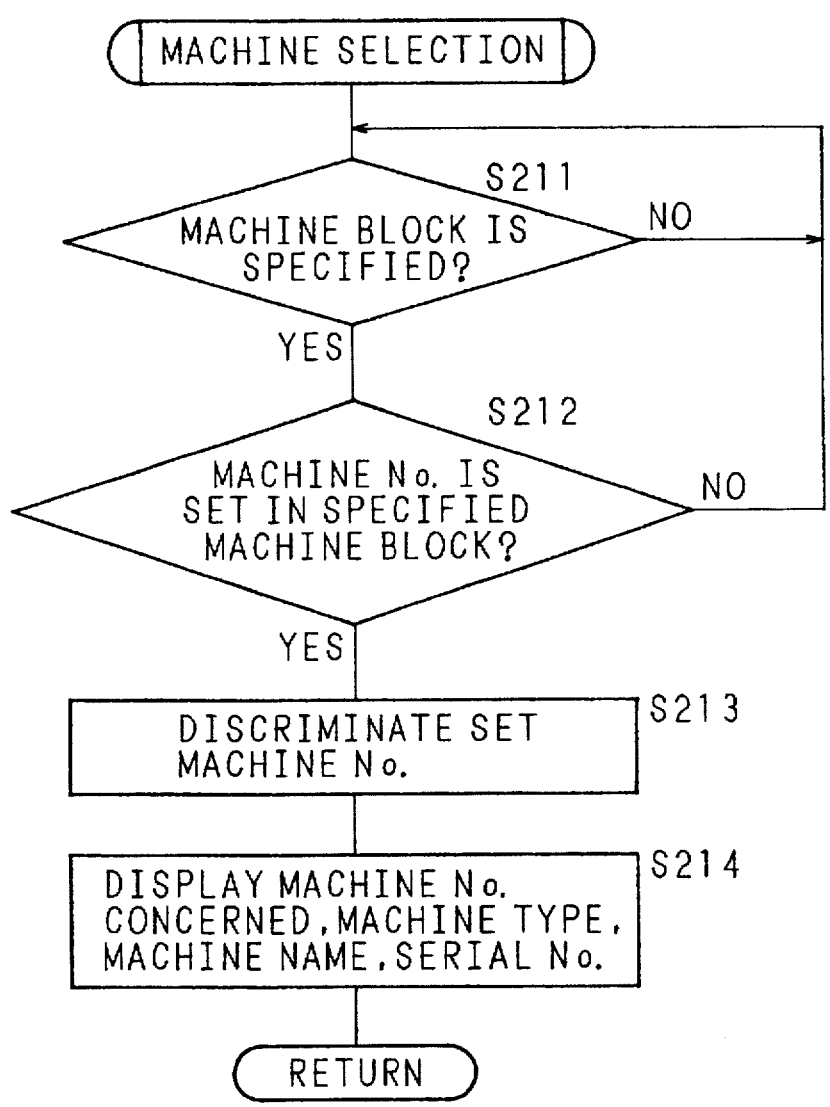
FIG. 5 is a flowchart showing a machine selection procedure.

FIG. 5 is a flowchart showing the above-mentioned machine selection procedure. The central control apparatus 3 stands by until a machine block 32 is designated on the machine selection screen (step S21). When the central control apparatus 3 determines that a machine block 32 has been designated, the apparatus 3 further determines whether a machine number has been set or not at the machine block 32 (step S212). When the central control apparatus 3 determines that a machine number has been set at the machine block 32, the apparatus 3 identifies the machine number (step S213), and displays the corresponding machine number, model name, machine name and production number in the machine information display area 35 (step S214).

On the other hand, when the central control apparatus 3 determines that the monitor by machine is not selected, the apparatus 3 further determines whether the detailed trouble monitor has been selected or not (step S23). When the apparatus 3 determines that the detailed trouble monitor has been selected, the apparatus 3 displays a detailed trouble information screen (step S24).

Figure 6:
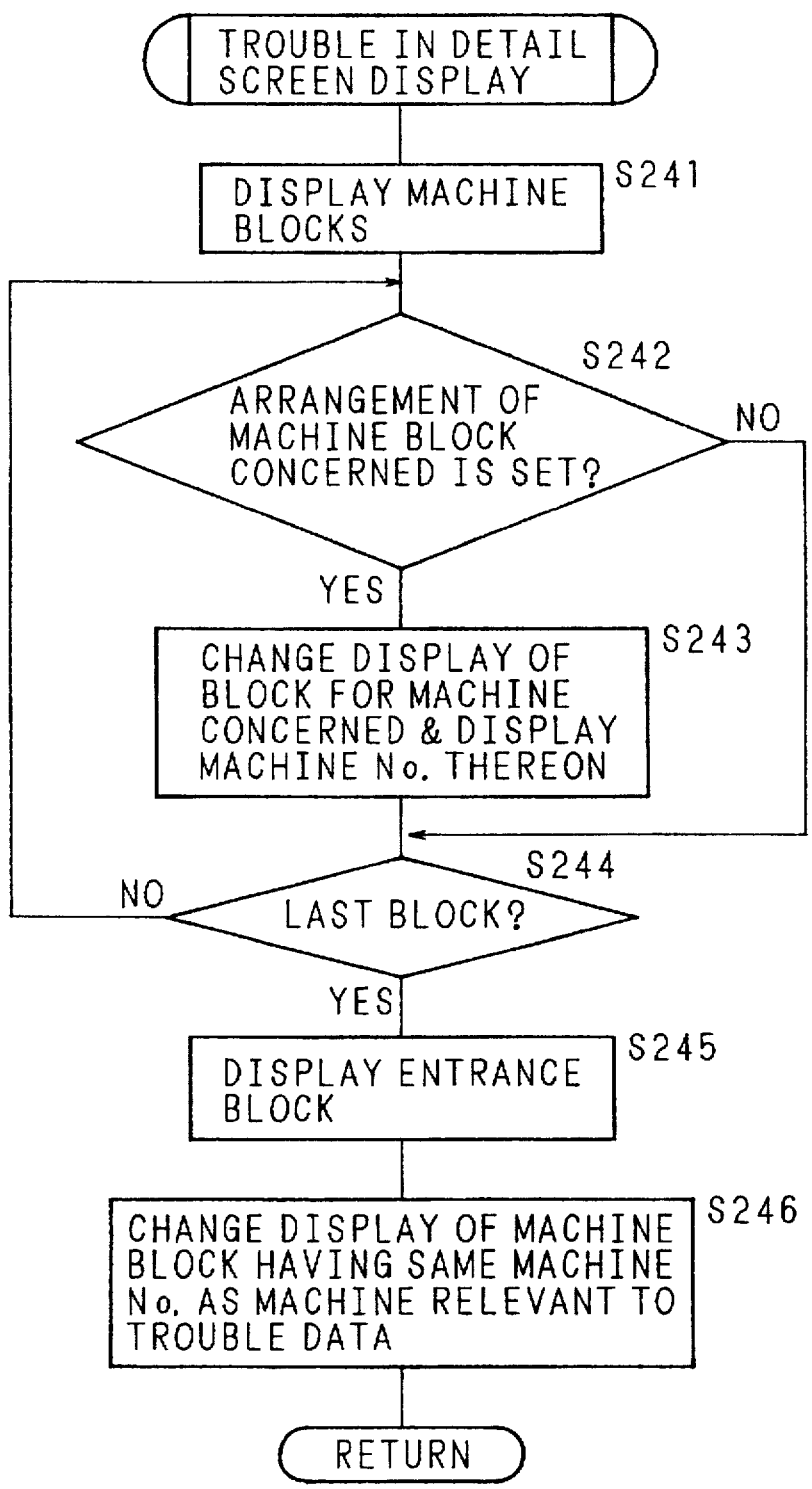
FIG. 6 is a flowchart showing a procedure for displaying a detailed trouble information screen.
Figure 11:
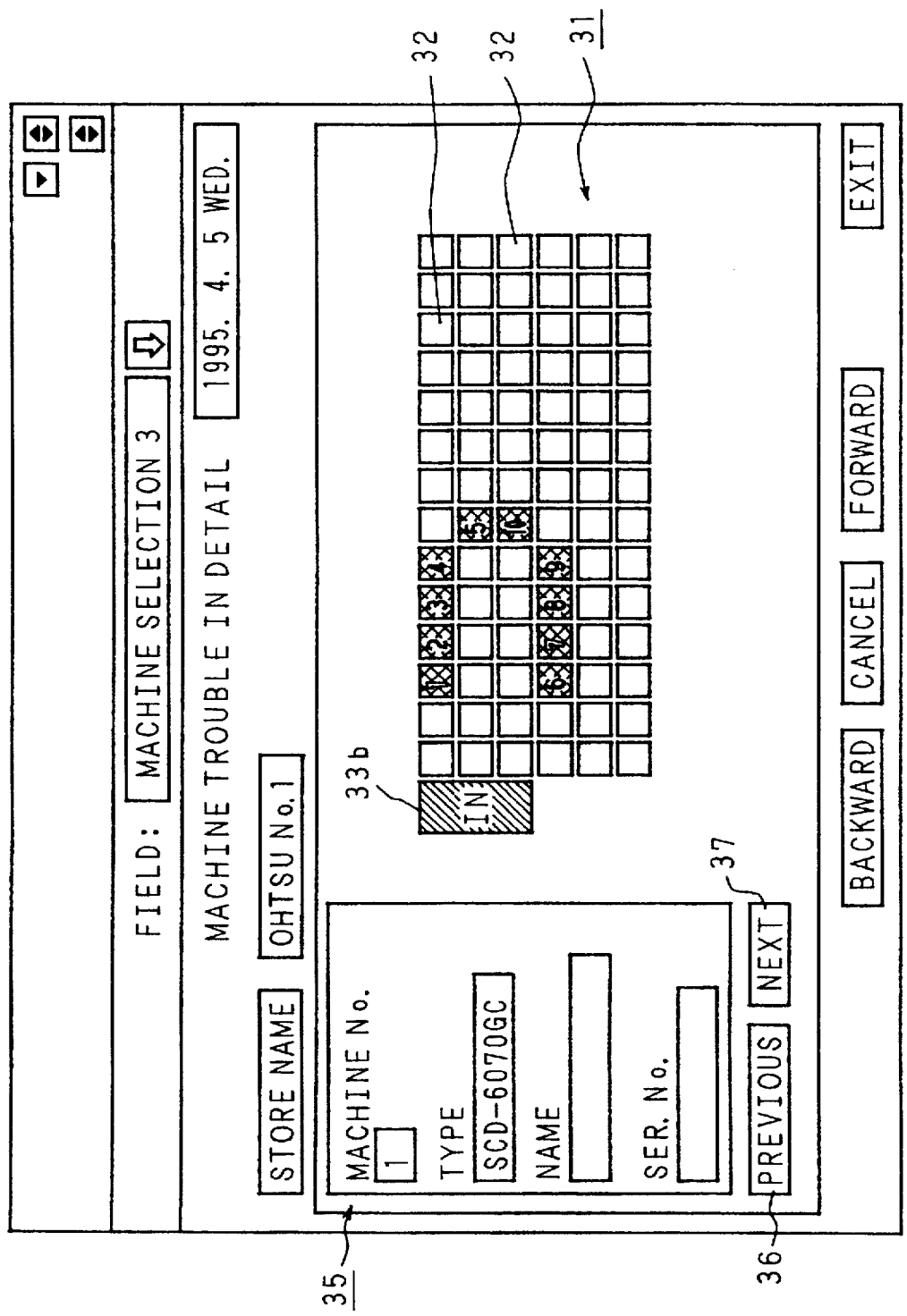
FIG. 11 is a view illustrating the detailed trouble information screen.

FIG. 6 is a flowchart showing a display procedure for the detailed trouble information screen (refer to FIG. 11). The central control apparatus 3 reads data regarding the corresponding launderette number from the member 3e in accordance with trouble data, and displays machine blocks 32, 32, . . . (step S241). The apparatus 3 determines whether a machine location has been set or not at the first machine block 32 in a predetermined order. When a location has been set at the machine block 32, the central control apparatus 3 changes the color of the machine block 32 and displays the machine number having been set (step S243). When no location is set, the indication of the machine block 32 is not changed. The central control apparatus 3 determines whether the machine block 32 is the last block or not (step S244), and repeats steps S242 and S243 until the last block is reached. When the operation for the last block is completed, the central control apparatus 3 displays the entrance block 33b at a predetermined position around the machine blocks 32, 32, . . . (step S245). The central control apparatus 3 then changes the indication of the machine block 32 provided with the same machine number as that included in the trouble data, namely changes the color of the indication or flashes the indication (step S246).

FIG. 11 is a view illustrating the detailed trouble information screen. From the DTC 7 installed in a launderette 2 wherein trouble occurred, information including the launderette number of the launderette and the machine numbers of the laundry machines 8, 8, . . . which caused trouble has been transmitted to the central control apparatus 3. In accordance with the transmitted launderette number, the central control apparatus 3 displays the name of the launderette 2 and also displays the locations of the laundry machines 8, 8, . . . installed in the launderette at the machine blocks 32, 32, . . . in the floor layout area 31 by indicating the machine numbers and coloring the blocks. In addition, in accordance with the machine numbers of the laundry machines 8, 8, . . . which caused trouble, the central control apparatus 3 displays the machine blocks of the corresponding machines by highlighting the indication of the machine numbers and/or by changing the color of the machine blocks 32, 32, . . . Consequently, the operator can recognize the locations and models of the laundry machines 8, 8, . . . which caused trouble, simply by looking at the display screen.

When the operator uses the pointer and selects the machine blocks 32, 32, . . . indicating the machine numbers of the laundry machines 8, 8, . . . , whose details are desired to be known, the central control apparatus 3 recognizes the selection, and performs troubleshooting for the laundry machines 8, 8, . . . corresponding to the selected machine numbers (step S25). On the other hand, when the central control apparatus 3 determines that the detailed trouble monitor has not been selected, the apparatus 3 performs a monitoring process, such as the totalization of sales figures in each launderette and the comparison of sales figures at launderettes, other than the monitor by machine (step S26).

Another embodiment in accordance with the invention is described below.

Figure 12:
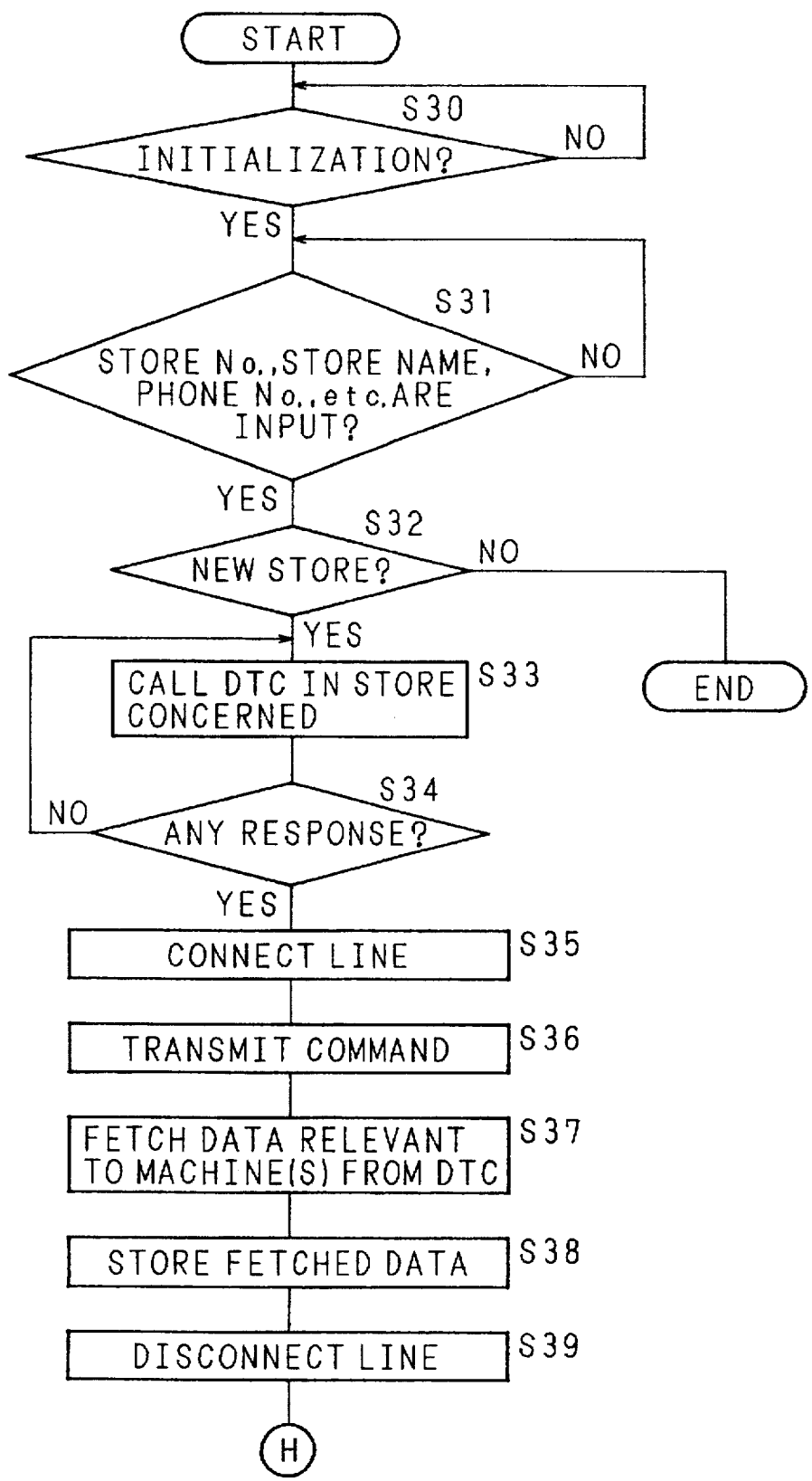
FIG. 12 is a flowchart showing another floor layout setting procedure for the central control apparatus shown in FIG. 1.
Figure 13:
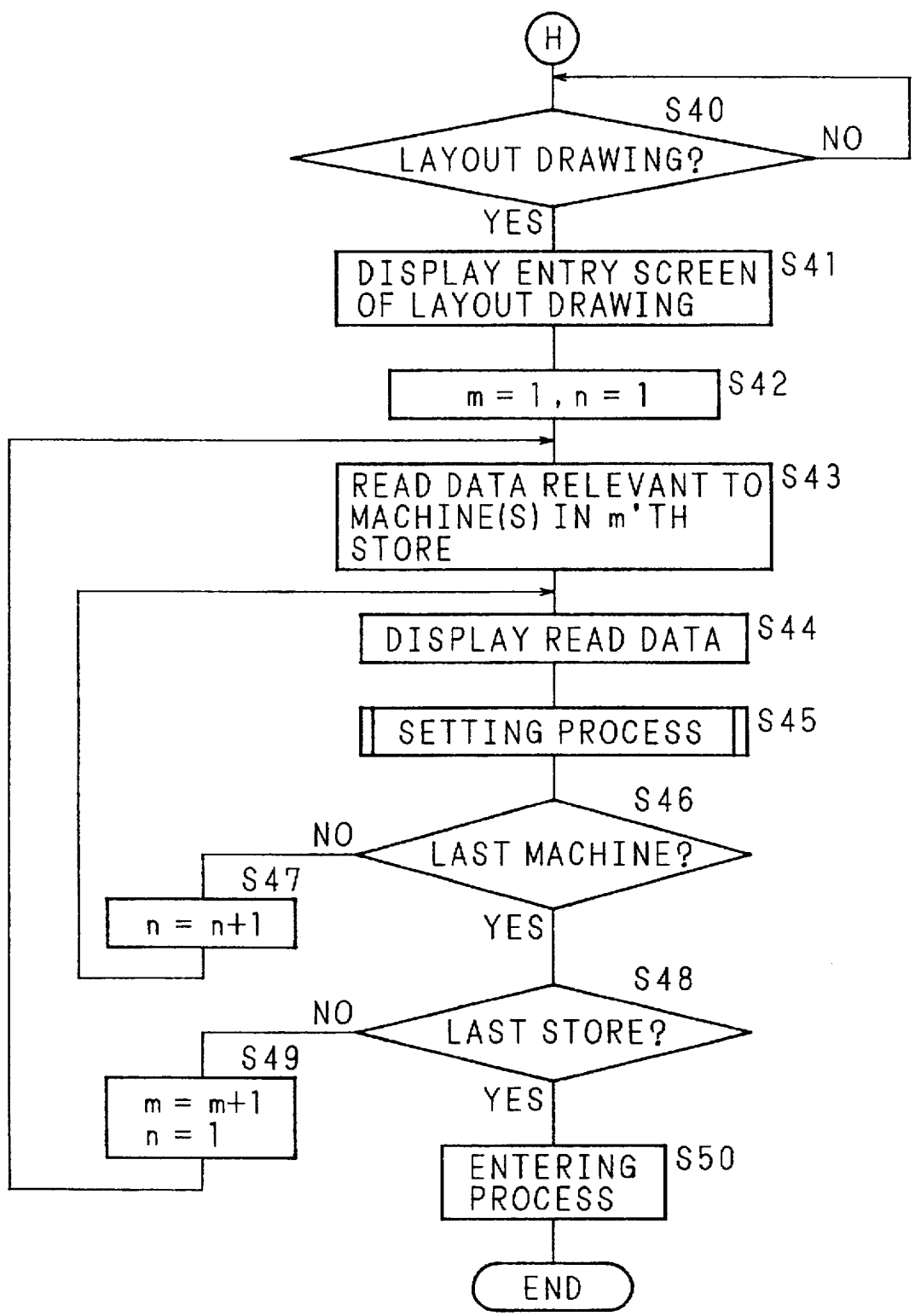
FIG. 13 is a flowchart showing another floor layout setting procedure for the central control apparatus shown in FIG. 1.

FIGS. 12 and 13 are flowcharts showing another layout setting procedures for the central control apparatus 3 shown in FIG. 1. In accordance with the information on the laundry machines 8, 8, . . . taken from the launderette 2, the central control apparatus 3 sets the locations of the machines, and sets and displays the floor shape of the launderette 2.

In the microcomputers 8a, 8a, . . . of the laundry machines 8, 8, . . . installed in each launderette 2, machine information such as the machine numbers and model names of the laundry machines 8, 8, . . . and classes representing communications specifications for the machines, have been set. The central control apparatus 3 determines whether the initial setting for the information of each launderette 2 and the laundry machines 8, 8, . . . installed therein has been selected or not (step S30). When the central control apparatus 3 determines that the initial setting has been selected, the apparatus 3 further determines whether the launderette information, such as the number, name and telephone number of the launderette 2 has been input from the input device 3c (step 31). When the apparatus 3 determines that such launderette information has been input, the apparatus 3 further determines whether the launderette information is new or not (step 32). When the apparatus 3 determines that the launderette information is new, the apparatus 3 calls up the DTC 7 installed in the launderette 2 via the public telephone line 5 (step S33).

The central control apparatus 3 determines whether a response has been received or not from the DTC 7 (step S34) and repeatedly calls up the DTC 7 until the apparatus 3 determines that a response has been received. When the central control apparatus 3 determines that a response has been received, the apparatus 3 makes connection to the public telephone line 5 (step S35), and transmits to the DTC 7 a command for making the DTC 7 transmit information on the laundry machines 8, 8, . . . (step S36). When the DTC 7 receives the command from the central control apparatus 3, the DTC 7 polls the microcomputers 8a, 8a, . . . of the laundry machines 8, 8, . . . to receive the information on the laundry machines 8, 8, . . . , and transmits the machine information to the central control apparatus 3. When the central control apparatus 3 receives the machine information transmitted from the DTC 7 (step S37), the apparatus 3 stores the machine information together with the launderette information in the memory 3e, and disconnects the connection (steps S38 and S39).

The central control apparatus 3 determines whether a layout diagram creation request has been input or not from the input device 3c (step S40). When the apparatus 3 determines that the request has been input, the apparatus 3 displays a floor layout entering screen (refer to FIG. 16) described later (step S41). The central control apparatus 3 then sets both the launderette number counter value m and the machine number counter value n at "1" (step S42), and reads the launderette information for launderette number "1" and the machine information for machine number "1" from the memory 3e (step S43). The apparatus 3 displays the launderette information and the machine information having been read on the floor layout entering screen (step S44), and performs a setting process by setting and storing the machine locations and the launderette floor layout as described later (step S45).

Figure 16:
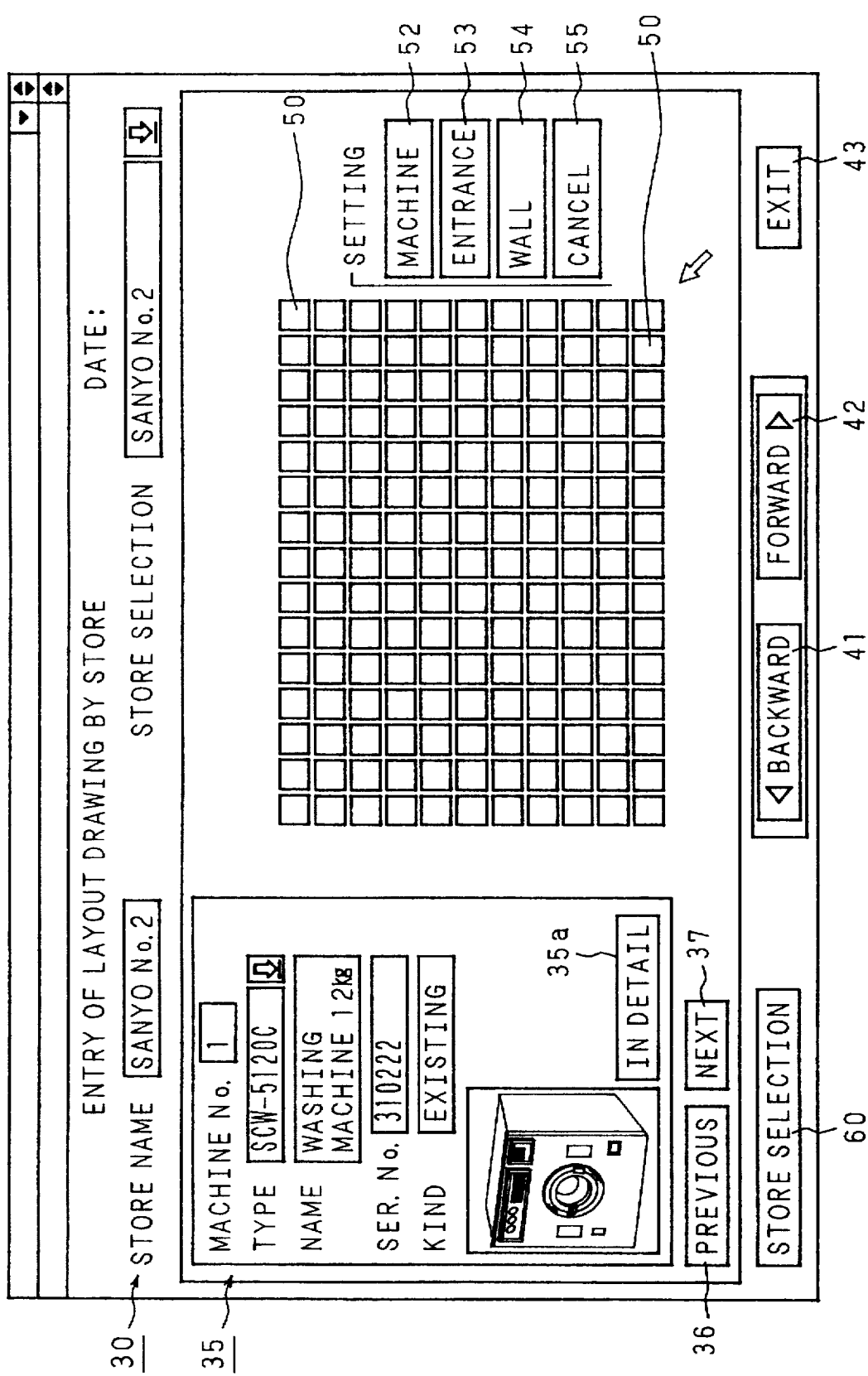
FIG. 16 is a view illustrating another floor layout diagram entering screen.

FIG. 16 is a view illustrating another layout diagram entering screen.

On the upper left side of the screen, a launderette name display area 30 for indicating the number and name of a launderette is provided. Under the launderette name display area 30, a machine information display area 35 is provided. In the machine information display area 35, machine number "1", and the model name, machine name, production number, class of the laundry machine corresponding to machine number "1", as well as an image of the model having been stored are indicated. In addition, a model information key (IN DETAIL) 35a is provided to indicate detailed information regarding the model in a window. Furthermore, under the machine information display region 35, a model selection key 36 "PREVIOUS MODELS" and a model selection key 37 "NEXT MODEL" are provided. When the operator moves the pointer to the model selection key 36 or 37 and clicks the key, the machine number previous or next to the indicated machine number is indicated in the machine information display area 35.

Figure 17:
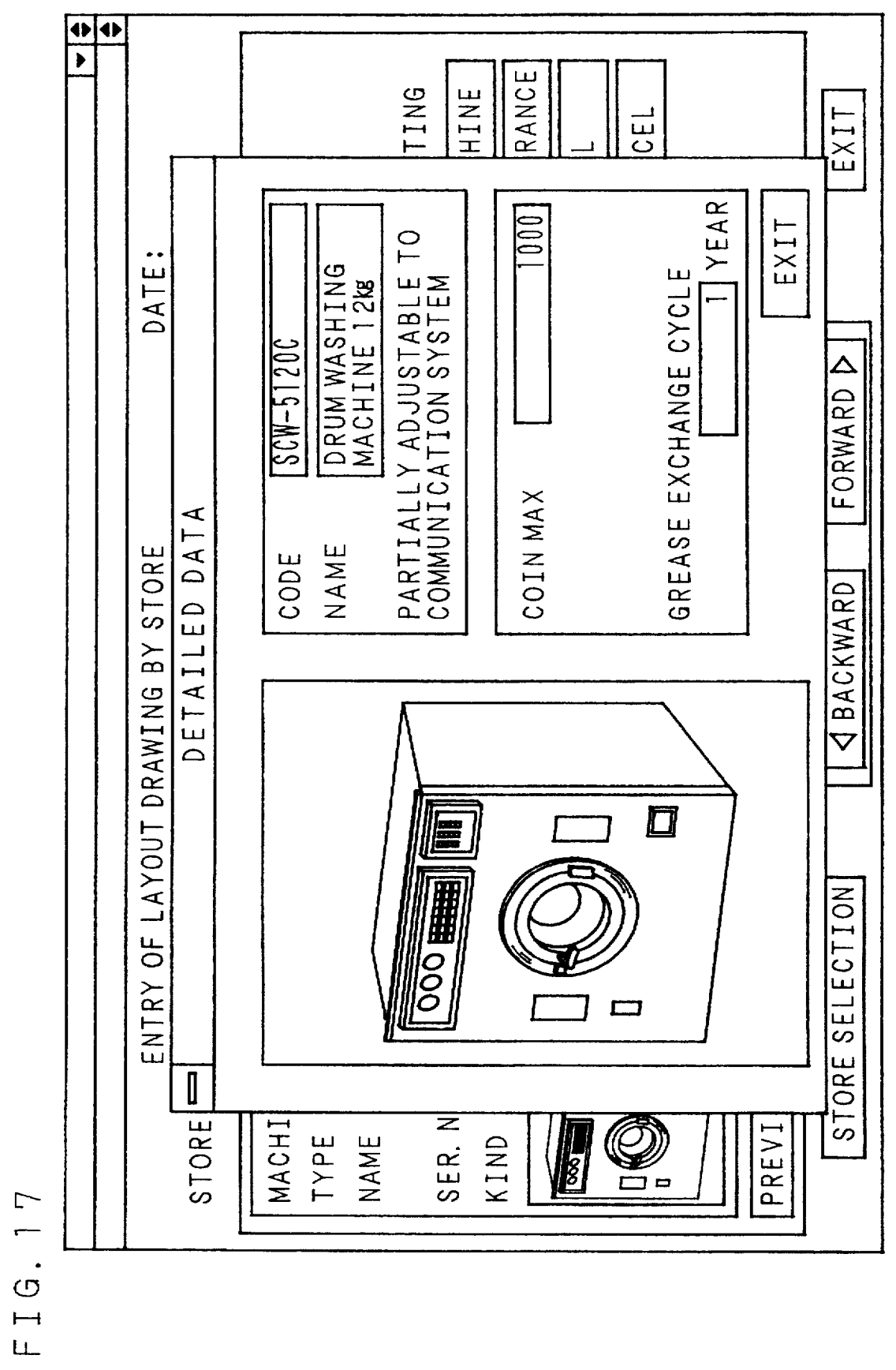

FIG. 17 is a view illustrating a display screen which appears when the model information key (IN DETAIL) 35a is clicked. The model information key (IN DETAIL) 35a can be operated when necessary. When the key is clicked, detailed information on the laundry machine corresponding to the machine number indicated in the machine information display area 35 shown in FIG. 16 is displayed by using an enlarged model information window shown in FIG. 17. Referring to FIG. 17, the image of the model is displayed on the left side of the screen. On the right side, detailed information such as the model code, model name and class of the machine as well as the maximum coin storage capacity and grease replacement interval are displayed.

In addition, referring to FIG. 16, a plurality of blocks 50, 50, . . . for setting the locations of the laundry machines 8, 8, . . . of the launderette corresponding to the launderette name are provided in the form of a matrix on the right side of the machine information display area 35. On the right side of the blocks, a MACHINE setting key 52 for setting machines, an ENTRANCE setting key 53 for setting entrances, a WALL setting key 54 for setting walls, by using the blocks 50, and a CANCEL key 55 for canceling these settings are provided vertically in the order described above. At the lower portion of the screen, a "STORE SELECTION" key 60 for displaying a launderette list having been stored in the memory 3e, a "BACKWARD" key 41 for displaying the preceding screen, the "FORWARD" key 42 for displaying the next screen and an "EXIT" key 43 for ending the execution of the management system are provided from left to right in the order described above.

Figure 14:
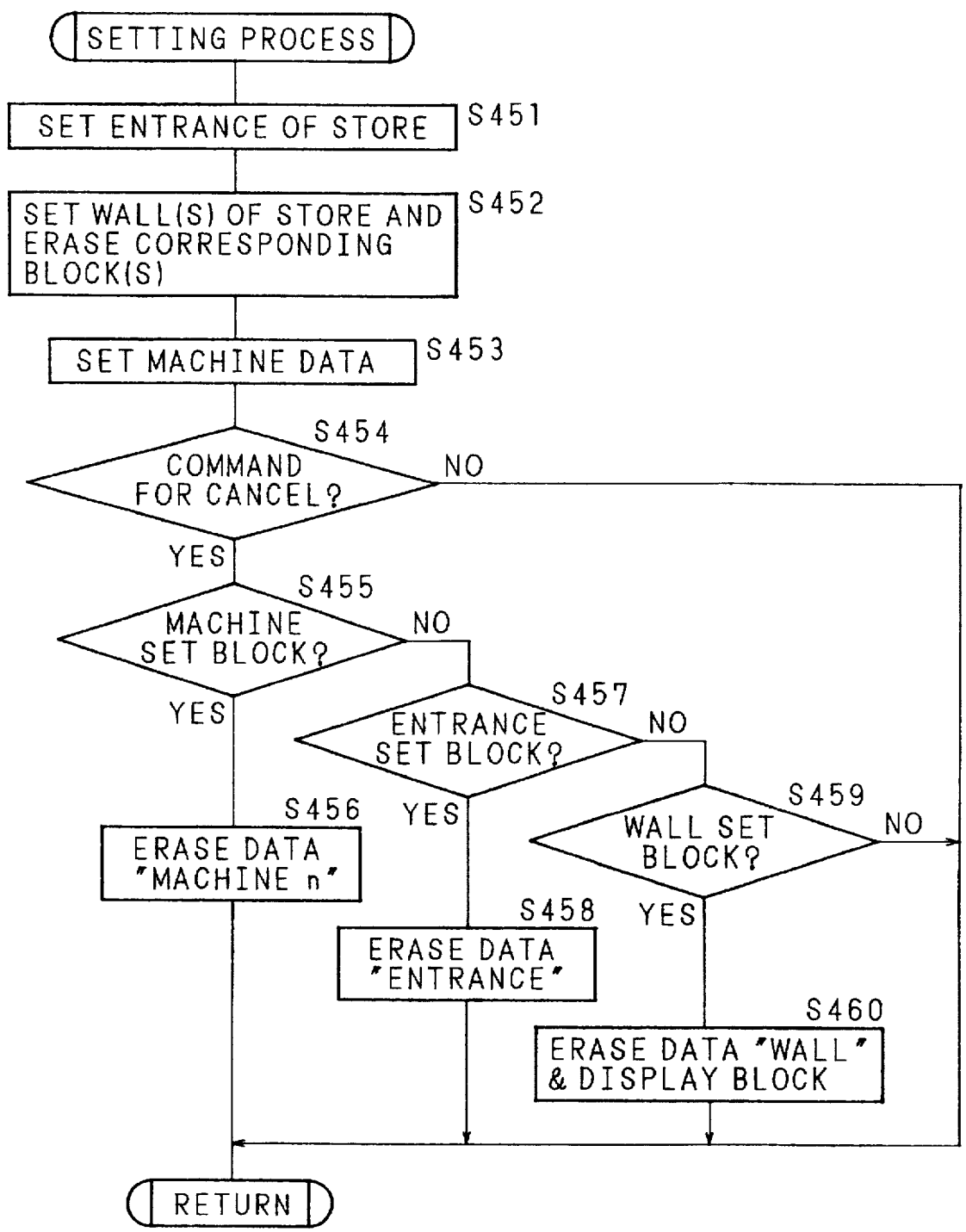
FIG. 14 is a flowchart showing the setting procedure shown in FIG. 13.
Figure 18:
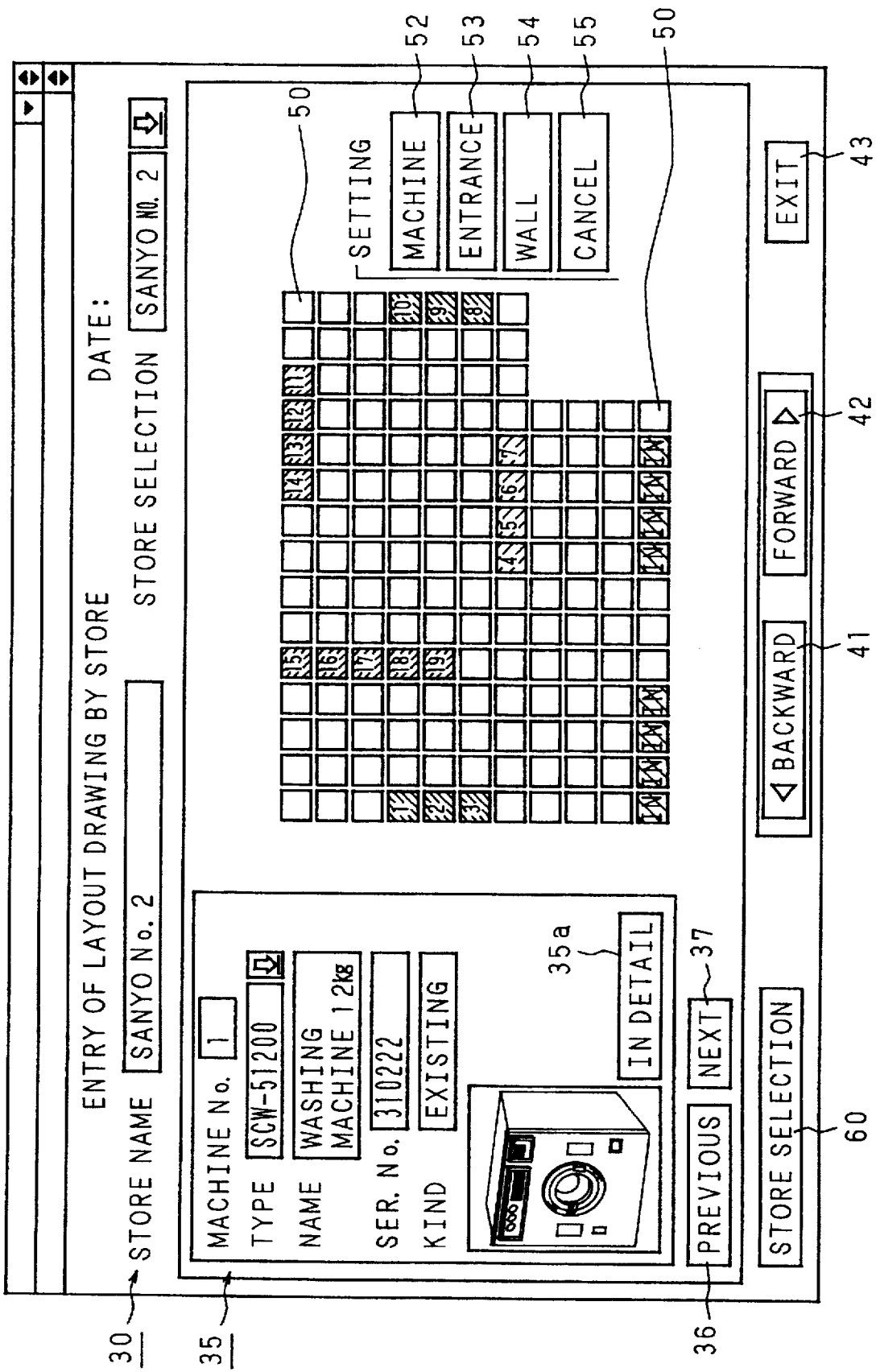
FIG. 18 is a view illustrating a screen having been set.

FIG. 14 is a flowchart showing the setting procedure shown in FIG. 13, and FIG. 18 is a view illustrating a screen having been set. After moving the pointer to the ENTRANCE setting key 53 and clicking the key, when the operator moves the pointer to some of the blocks 50, 50, . . . depending on the locations and the number of entrances of the launderette and clicks the blocks, the central control apparatus 3 colors the blocks 50, 50, . . . (in bluish purple, for example), and "ENTRANCE" is indicated in reverse video (step-S451). After moving the pointer to the WALL setting key 54 and clicking the key, when the operator moves the pointer to some of the blocks 50, 50, . . . depending on the shape of the launderette floor and clicks the blocks, the central control apparatus 3 assigns wall data to the blocks 50, 50, . . . and deletes the blocks 50, 50, (step S452).

In addition, after moving the pointer to the MACHINE setting key 52 and clicking the key, when the operator moves the pointer to some of the blocks 50, 50, . . . depending on the installation locations in the launderette and clicks the blocks, the central control apparatus 3 colors the blocks 50, 50, . . . depending on the type of the block (reddish purple for swirling washing machines, green for drum washing machines, light red for gas dryers, light blue for dryers and yellow for electric dryers) and displays the machine numbers indicated in the machine information display area 35 (step S453).

On the other hand, after moving the pointer to the CANCEL key 55 and clicking the key, when the operator moves the pointer to a block 50 or the position wherein a block 50 was displayed and clicks the block or position, the central control apparatus 3 determines that a cancel command has been issued (step S454). The apparatus 3 then determines whether a machine has been set, an entrance has been set or a wall has been set (steps S455, S457 and S459). When the central control apparatus 3 determines that a machine has been set, the apparatus 3 eliminates the color of the block and deletes the machine number (step S456). When the apparatus 3 determines that an entrance has been set, the apparatus 3 eliminates the color of the blocks and deletes the data of entrance (step S458). When the apparatus 3 determines that a wall has been set, the apparatus 3 deletes wall data and displays the blocks (step S460) and the operation sequence is shifted to step S46 (refer to FIG. 13). In this way, the block information on the floor layout of the launderette and the locations of the laundry machines installed in the launderette is obtained.

The central control apparatus 3 determines whether the machine number indicated in the machine information display area 35 is the last machine number of the laundry machines 8, 8, . . . located in the launderette 2 (step S46). When the machine number is not the last number, the machine number counter value n is incremented by only one (step S47), and the operation sequence returns to step S44. The central control apparatus 3 repeats steps S44 to S47 until the apparatus 3 determines in step S46 that the machine number is the last machine number.

When the central control apparatus 3 determines in step S46 that the machine number is the last machine number, the apparatus 3 further determines whether the launderette number of the launderette 2 displayed in the machine information display area 35 is the last launderette number stored in the memory 3e (step S48). When the apparatus 3 does not determine that the launderette number is not the last launderette number, the apparatus 3 increments the launderette number counter value m by only one, and resets the machine number counter value n to "1" (step S49), and the operation sequence returns to step S43. The apparatus 3 repeats steps S43 to S49 until the apparatus 3 determines instep S48 that the launderette number is the last launderette number. When the central control apparatus 3 determines that the launderette number is the last launderette number, the apparatus 3 enters the block information used for the location setting in the memory 3e, with the block information being related to the machine information and the launderette information (step S50).

Figure 15:
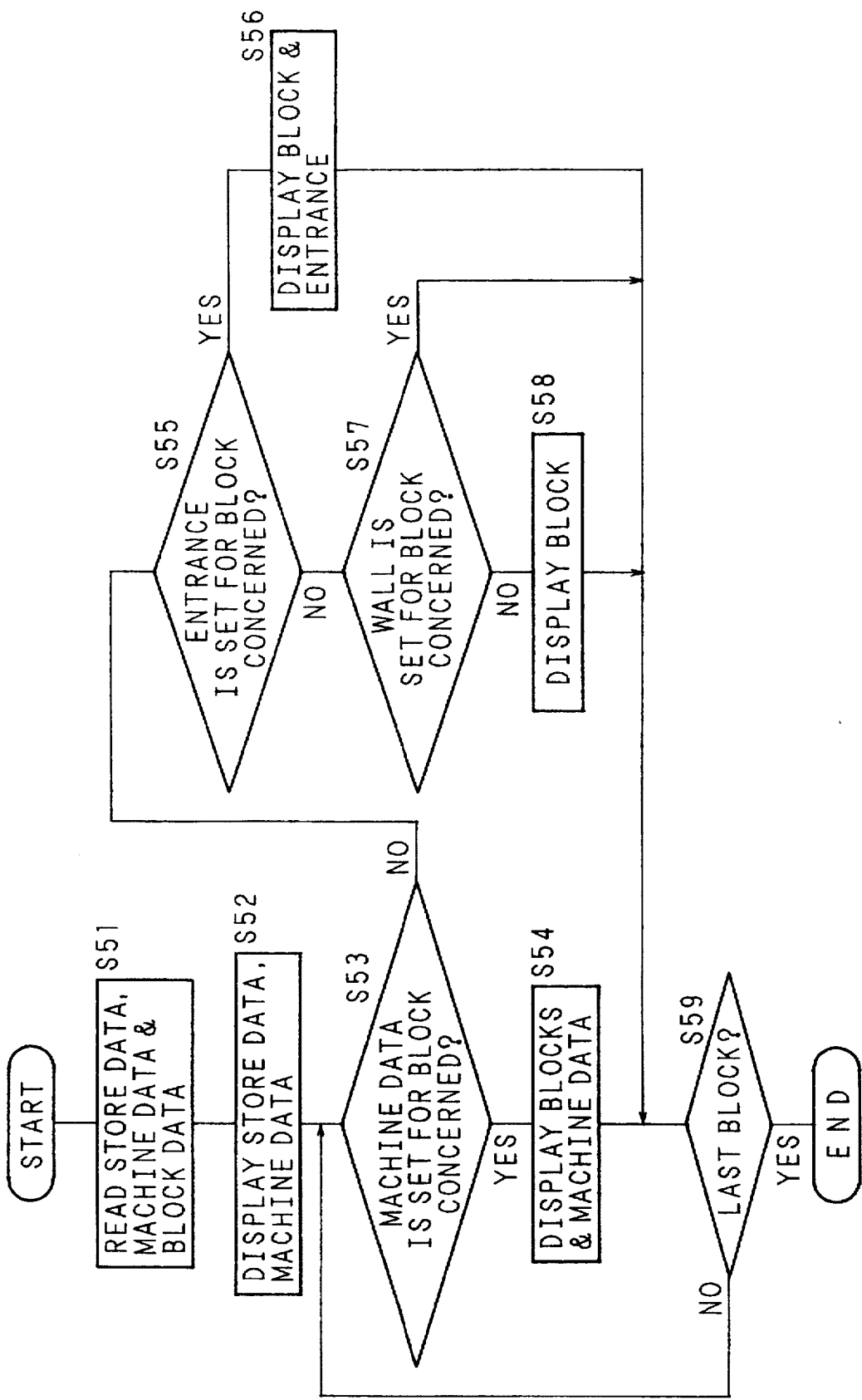
FIG. 15 is a flowchart showing a procedure for displaying a floor layout entered in memory.
Figure 19:
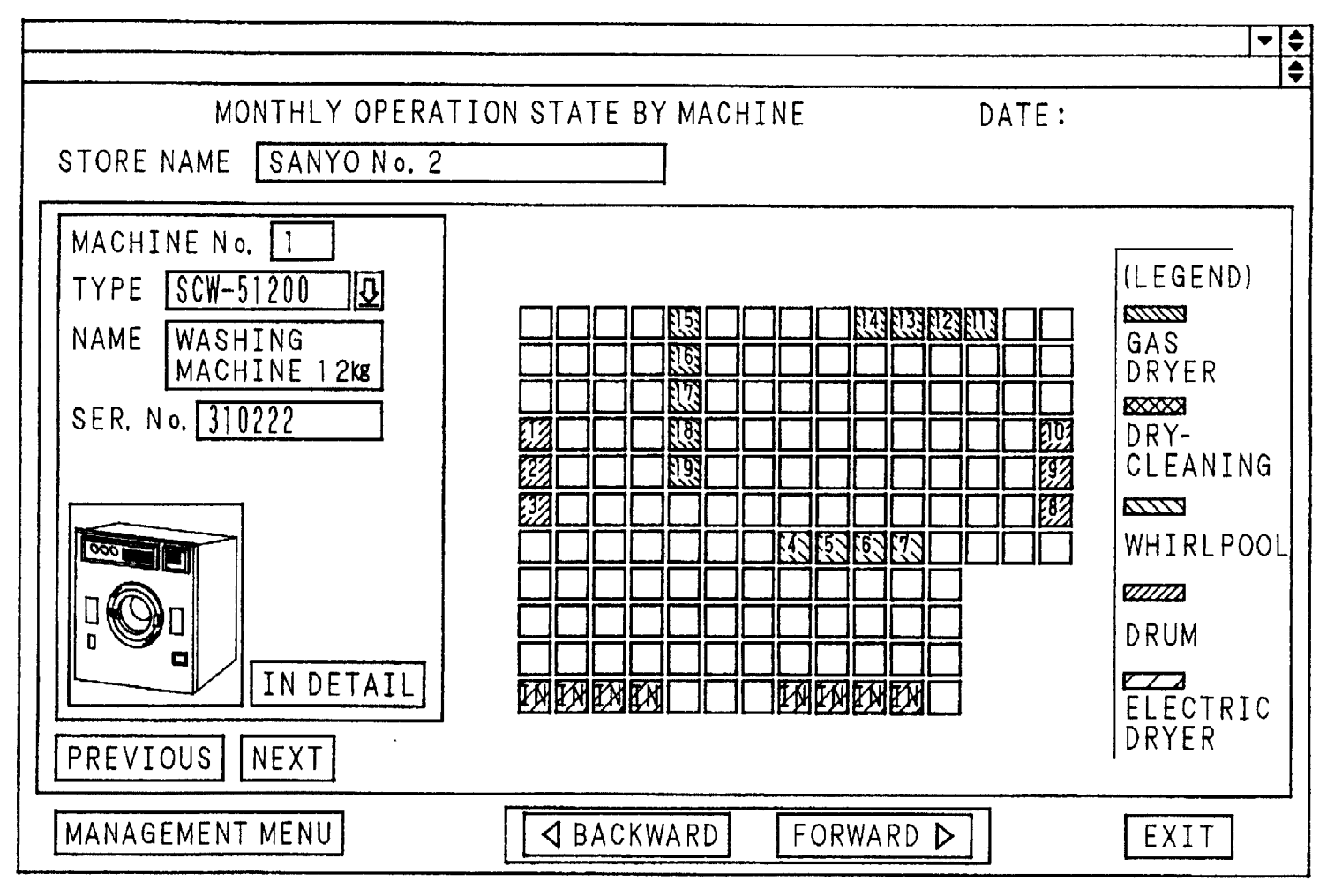

FIG. 15 is a flowchart showing the display procedure for the floor layout entered in the memory 3e, and FIG. 19 is a view for illustrating a floor layout display screen. When a display request for a launderette 2 is issued, the central control apparatus 3 reads the block information, machine information and launderette information on the launderette 2 from the memory 3e (step S51), and displays the launderette information and the machine information on machine number 1 in the machine information display area (step S52). The central control apparatus 3 then displays the blocks 50, 50, . . . in a predetermined order on the right side of the machine information display area 35.

The central control apparatus 3 determines whether machine information has been set, whether an entrance has been set and whether a wall has been set in the block information to be displayed (steps S53, S55 and S57). When machine information has been set, the block 50 is colored depending on the model, and the block and the machine number are displayed (step S54). When the apparatus 3 determines that an entrances has been set, the block 50 is colored, and the block and the entrance are displayed (step S56). When the apparatus 3 determines that a wall has been set, the block 50 is not displayed. When the apparatus 3 determines that none of the above settings has been performed, only the block 50 is displayed (step S58). The operation sequence is then shifted to step S59, and the central control apparatus 3 determines whether the block is the last block. The apparatus 3 repeats steps S53 to S59 until the apparatus 3 determines that the block is the last block.

Although the block 50 used for wall setting is not displayed in FIG. 19, the invention is not limited to this method, but it is needless to say that "WALL" can be displayed and colored. Furthermore, "FLOOR" can be set in appropriate blocks 50, 50, . . . depending on the floor shape of the launderette so as to indicate only the blocks 50, 50, . . . used for floor setting. In this case, the central control apparatus 3 is intended to operate so that the machine number and entrances can be set additionally in the blocks 50, 50, . . . used for floor setting. Furthermore, although only entrances have been set in the launderette floor layout, the invention is not limited to this setting, but windows, passageways, elevators, etc. may be set.

Figure 20:
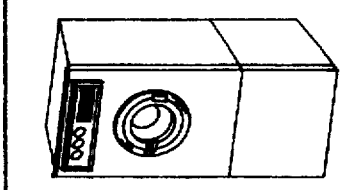
FIG. 20 is a view illustrating a display screen of the central control apparatus at the time of trouble in a laundry machine installed in a launderette.

FIG. 20 is a view illustrating a display screen displayed by the central control apparatus 3 when a laundry machine installed in a launderette causes trouble. When trouble occurs in a laundry machine, the trouble information is transmitted from the DTC installed in the launderette to the central control apparatus. Upon receiving the information, the central control apparatus displays such a detailed trouble display as that shown in FIG. 20. Referring to FIG. 20, machine information such as the machine number, model number, etc. of the laundry machine which caused trouble and a trouble code are indicated under the name of the launderette which caused trouble. The launderette and the locations of the laundry machines installed therein are displayed, and the color (dark red, for example) of the laundry machine which caused trouble is made different from the color of other laundry machines. In addition, the date and time of trouble occurrence are indicated on the right side of the machine location display area. With this screen, the operator can recognize the location of the laundry machine which caused trouble and the kind of trouble at a glance.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A remote management system where a central control apparatus manages a machine remotely based on data concerning the machine which is transmitted from the machine to said central control apparatus, said central control apparatus comprising:

layout setting means for setting a machine layout of an area indicating the arrangement where said machine is installed in said area; and layout displaying means for displaying a picture of said machine layout of said area.

2. A remote management system as set forth in claim 1, wherein said central control apparatus manages machines in a plurality of areas and said layout setting means sets a machine layout for each of said areas;

said central control apparatus further comprising:
area specifying means for specifying one of said plurality of areas, and
storing means for storing data of the machine layout of said plurality of areas corresponding to data for specifying each said area, and
said layout displaying means including:
means for displaying a picture of the machine layout of a specified area.

3. A remote management system as set forth in claim 1, wherein said machine is a laundry machine.

4. A remote management system as set forth in claim 1, wherein said layout displaying means includes means for displaying a picture of an area divided into a plurality of blocks, and said central control apparatus, further comprising:
first specifying means for specifying a position on said picture of said area displayed by said layout displaying means; and
storing means for storing data of said machine layout of said area,
said layout setting means including:
means for causing said storing means to store data of the specified area to indicate the position of the machine in the area where the machine is installed, and
said layout displaying means further including:
means for differing the display mode of said specified block from that of the other blocks of said picture.

5. A remote management system as set forth in claim 4, wherein said central control apparatus further comprises:
second specifying means for specifying a position around said plurality of blocks,
said layout setting means including:
means for setting a layout of an element which forms the outline of said area at the position specified by said second specifying means; and
means for causing said storing means to store data of the layout of said element set by said setting means, and
said layout displaying means including:
means for displaying a picture of said element at the specified position around said displayed plurality of blocks.

6. A remote management system as set forth in claim 4, wherein said layout setting means includes:
first data setting means for setting first data concerning the machine on the block specified by said first specifying means; and
means for causing said storing means to store said first data set by said first data setting means, and
said layout displaying means includes:
means for displaying said first data set by said first data setting means on the block which is specified by said first specifying means from said plurality of displayed blocks.

7. A remote management system as set forth in claim 6, wherein said central control apparatus further comprises:
means for causing said storing means to store second data concerning a machine other than said first data by correlating said second data to said first data, and
said layout displaying means includes:
means for displaying said stored second data correlated to said first data of the block specified by said first specifying means when the block among said plurality of blocks which displays the machine layout is specified by said first specifying means.

8. A remote management system as set forth in claim 7, wherein said central control apparatus further comprises:
transmitting means for transmitting to said machine a transmission instruction of said first and second data to set the machine layout at the central control apparatus,
receiving means for receiving said first and second data transmitted from the machine in response to the transmission instruction; and
means for causing said storing means to store the data received by said receiving means whereby said layout displaying means displays said stored first and second data when said plurality of blocks is displayed.

9. A remote management system as set forth in claim 8, wherein said central control apparatus, further comprises:
means for causing said storing means to store said first and second data by correlating this data to data which specifies the area where the machine is installed.

10. A remote management system as set forth in claim 4, wherein said machine is a laundry machine.

11. A remote management system as set forth in claim 1, wherein said layout displaying means includes means for displaying a picture of a machine layout in said area and a layout of an element which forms the outline of said area as being divided into a plurality of blocks, and said central control apparatus further comprises:
first specifying means for specifying a position on the picture of the machine layout displayed by said layout displaying means;
third specifying means for specifying a layout position on the picture of said element displayed by said layout displaying means; and
storing means for storing the data of said machine layout and said element layout, said layout setting means including:
means for causing said storing means to store the data of the block specified by said first specifying means as data to indicate the arranged position of the machine in said area; and
means for causing said storing means to store the data of the block specified by said third specifying means as data to indicate the position of the element around said area, and said layout displaying means further comprising:
means for respectively differing display modes of the block specified by said first specifying means the block specified by said third specifying means, and the other blocks.

12. A remote management system as set forth in claim 11, wherein said layout setting means includes:
first data setting means for setting first data concerning the machine on the block specified by said first specifying means; and
said layout displaying means includes
means for displaying said first data set by said first data setting means on the block which is specified by first specifying means among said displayed plurality of blocks.

13. A remote management system as set forth in claim 11, wherein said layout setting means includes:
third data setting means for setting third data concerning the element layout around said area; and
means for causing said storing means to store said third data set by said third data setting means; and said layout displaying means includes:
means for displaying said third data set by said third data setting means on the block which is specified by said third specifying means among said displayed plurality of blocks.

14. A remote management system as set forth in claim 11, wherein said third specifying means includes:
on/off specifying means for specifying the status of each of said plurality of blocks to display or erase, said layout setting means including:
means for causing said storing means to store the data of said status and the position of the block when said block and the status thereof are specified by said on/off specifying means of said third specifying means, and said layout displaying means includes:
means for displaying or erasing the block specified by said third specifying means according to the status specified by said on/off specifying means of said third specifying means.

15. A remote management system as set forth in claim 12, wherein said central control apparatus further comprises:
means for causing said storing means to store second data concerning the machine other than said first data by correlating said second data to said first data, and said layout displaying means including:
means for displaying said stored second data correlated to said first data of the block specified by said first specifying means when the block among the plurality of blocks which displays the machine layout is specified by said first specifying means.

16. A remote management system as set forth in claim 15, wherein said central control apparatus further comprises:
transmitting means for transmitting to said machine a transmission instruction of said first and second data therefrom;
receiving means for receiving said first and second data transmitted from the machine in response to the transmission instruction; and
means for causing said storing means to store the data received by said receiving means,
whereby said layout displaying means displays said stored first and second data when said plurality of blocks is displayed.

17. A remote management system as set forth in claim 16, wherein said central control apparatus further comprises:
means for causing said storing means to store said first and second data by correlating this data to data which specifies the area where the machine is installed.

18. A remote management system as set forth in claim 11, wherein said machine is a laundry machine.

* * * * *

UNITED STATES PATENT AND TRADEMARK OFFICE
CERTIFICATE OF CORRECTION

PATENT NO. : 5,777,895
DATED : July 7, 1998
INVENTOR(S) : Kiyomitsu Kuroda et al.

It is certified that error appears in the above-identified patent and that said Letters Patent is hereby corrected as shown below:

On the title page, Inventors residences should read as follows:

City/Country:
(1) "Otsu" should be --Shiga--;
(2) "Kusatsu" should be --Shiga--;
(3) "Kameoka" should be --Kyoto--.

Signed and Sealed this

Eighth Day of December, 1998

Attest:

BRUCE LEHMAN

Attesting Officer

Commissioner of Patents and Trademarks